United States Patent
Ono et al.

(10) Patent No.: US 12,308,688 B2
(45) Date of Patent: May 20, 2025

(54) CONTROL CIRCUIT AND POWER SOURCE DEVICE

(71) Applicant: SHINDENGEN ELECTRIC MANUFACTURING CO., LTD., Tokyo (JP)

(72) Inventors: Hideyuki Ono, Saitama (JP); Shigeru Hisada, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 669 days.

(21) Appl. No.: 17/642,232

(22) PCT Filed: Sep. 3, 2020

(86) PCT No.: PCT/JP2020/033382
§ 371 (c)(1),
(2) Date: Mar. 11, 2022

(87) PCT Pub. No.: WO2021/049404
PCT Pub. Date: Mar. 18, 2021

(65) Prior Publication Data
US 2022/0320889 A1 Oct. 6, 2022

(30) Foreign Application Priority Data
Sep. 13, 2019 (JP) .................... 2019-166878

(51) Int. Cl.
*H02J 7/00* (2006.01)
*H02J 7/34* (2006.01)
(52) U.S. Cl.
CPC ........ *H02J 7/007184* (2020.01); *H02J 7/345* (2013.01); *H02J 2207/50* (2020.01)

(58) Field of Classification Search
CPC ............... H02J 7/007184; H02J 7/345; H02J 2207/50
(Continued)

(56) References Cited

U.S. PATENT DOCUMENTS

| 8,564,975 B2 * | 10/2013 | Sato ................. H02M 3/33507 363/21.16 |
| 9,343,976 B2 * | 5/2016 | Chu ....................... H02M 7/06 |
| 9,374,019 B2 * | 6/2016 | Li ......................... H02J 7/0036 |

(Continued)

FOREIGN PATENT DOCUMENTS

| CN | 108933519 A | 12/2018 | |
| CN | 2017188978 A * | 1/2019 | ............... H02J 7/00 |

(Continued)

OTHER PUBLICATIONS

Bao et al., Chinese Patent Document No. CN-108183543-A, published Jun. 19, 2018, 3 pages including abstract and 1 drawing. (Year: 2018).*

(Continued)

*Primary Examiner* — Phallaka Kik
(74) *Attorney, Agent, or Firm* — HAUPTMAN HAM, LLP

(57) ABSTRACT

Provided is a control circuit which can discharge a charge stored in an X capacitor with certainty even when an alternating current input voltage largely fluctuates. The control circuit for controlling a discharge of an X capacitor C100 connected between power source lines AC1 and AC2 having different polarities of an alternating current of an AC-DC convertor which receives inputting of the alternating current, converts the alternating current into a direct current, and outputs the direct current wherein the control circuit detects a change state of a voltage of the X capacitor C100, and controls the discharge such that a charge stored in the X capacitor C100 is discharged based on the change state.

12 Claims, 14 Drawing Sheets

(58) Field of Classification Search
USPC ........................................................ 320/166
See application file for complete search history.

(56) References Cited

U.S. PATENT DOCUMENTS

| | | | |
|---|---|---|---|
| 2012/0112564 A1 | 5/2012 | Wu et al. | |
| 2013/0033236 A1* | 2/2013 | Li | H02J 7/0036 327/333 |
| 2013/0188405 A1* | 7/2013 | Jin | H02M 7/217 363/49 |
| 2013/0194846 A1* | 8/2013 | Taddeo | H02M 1/10 363/123 |
| 2015/0288286 A1 | 10/2015 | Chu | |
| 2016/0226371 A1 | 8/2016 | Tsou et al. | |
| 2017/0271904 A1* | 9/2017 | Ziv | H05B 47/115 |
| 2018/0019656 A1 | 1/2018 | Matsuda et al. | |
| 2018/0062546 A1* | 3/2018 | Xiang | H02P 3/02 |
| 2018/0337592 A1* | 11/2018 | Kuo | H02M 1/36 |
| 2019/0074761 A1* | 3/2019 | Matsuda | H02M 1/32 |
| 2020/0324665 A1* | 10/2020 | Mackenzie | B60L 53/22 |

FOREIGN PATENT DOCUMENTS

| | | | | |
|---|---|---|---|---|
| JP | 08331771 A | * | 12/1996 | |
| JP | 2001211549 A | * | 8/2001 | |
| JP | 2016158310 A | | 9/2016 | |
| JP | 2018098823 A | * | 6/2018 | |
| JP | 2019009947 A | * | 1/2019 | |
| JP | 2019047621 A | * | 3/2019 | ............ H02M 1/08 |
| TW | 1573365 B | * | 6/2018 | |

OTHER PUBLICATIONS

Ding et al., Chinese Patent Document No. CN-109177747-A, published Jan. 11, 2019, 4 pages including abstract, claim and 1 drawing. (Year: 2019).*
International Search Report in PCT/JP2020/033382, mailed Nov. 17, 2020. 4pp.
Search Report in NL application No. 2026428, mailed Oct. 12, 2021. 8pp.

* cited by examiner

180
CONTROL CIRCUIT AND POWER SOURCE DEVICE

RELATED APPLICATIONS

The present application is a National Phase of International Application No. PCT/JP2020/033382 filed Sep. 3, 2020, which claims priority to Japanese Application No. 2019-166878, filed Sep. 13, 2019.

BACKGROUND OF THE INVENTION

Field of the Invention

The present invention relates to a control circuit which controls a discharge of a capacitor connected between power source lines having different polarities of an alternating current (AC) of an AC-DC convertor which receives inputting of the alternating current, converts the alternating current into a direct current (DC), and outputs the direct current, and a power source device provided with the control circuit.

Description of the Related Art

In the AC-DC convertor which receives inputting of an alternating current (AC), converts the alternating current into a direct current (DC), and outputs the direct current DC, in general, a capacitor (so-called X capacitor) is connected between power source lines having different polarities of an alternating current input side for preventing the generation of noises. Although noises generated by inputting of an alternating current is eliminated by the X capacitor, when the input supply of an alternating current is interrupted as in the case where a plug which supplies an alternating current to the AC-DC convertor is pulled out from an outlet, a charge stored in the above-mentioned X capacitor before the input supply of an alternating current is interrupted remains in the X capacitor. Accordingly, for ensuring safety, it is necessary to discharge a residual charge.

As a method of discharging a residual charge stored in the X capacitor, for example, there has been known an invention disclosed in JP 2016-158310 A.

The invention disclosed in the publication is described using FIG. 14 and FIG. 15. FIG. 14 is a view for describing a conventional discharge circuit of a power source device disclosed in the publication. FIG. 15 is a view for describing operation timing of the circuit shown in FIG. 14.

As shown in FIG. 14, the conventional discharge circuit 940 includes: a voltage dividing circuit 941 which is formed of resistances R903 and R904 connected in series between a high voltage input starting terminal HV and a ground point; a peak hold circuit 942 which holds a peak value of a voltage divided by the voltage dividing circuit 941; a voltage comparison circuit 943 which compares a potential (voltage) Vn902 of a connection node N902 between the resistances R903 and R904 and a voltage which is obtained by proportionally reducing a voltage held by the peak hold circuit 942; a timer circuit 944 which counts a time during which the potential (voltage) Vn902 is a fixed value or more; and a series connection circuit formed of a switch S900 and a discharge unit 945 which is disposed parallel to the voltage dividing circuit 941 between the high voltage input starting terminal HV and the ground point. The discharge unit 945 is formed of a resistance Rd900 and a switch Sd900. A connecting portion between the switch S900 and the discharge unit 945 is connected to a power source voltage terminal VDD, and the other side of the power source voltage terminal VDD is grounded via a capacitor C900. The switch S900 is a switch controlled by a starting circuit 950. In this specification, "voltage" may be also referred to as "potential".

The above-mentioned voltage comparison circuit 943 compares a value which is 30% of a peak value of the potential Vn902 of the connection node N902 and the potential Vn902 of the connection node N902, and detects whether or not the potential Vn902 becomes lower than the value which is 30% of the peak value of the potential Vn902 of the connection node N902. The timer circuit 944 counts a time during which the potential Vn902 is not lower than a voltage Vp, and when it is determined that a count time exceeds 30 ms, for example, the timer circuit 944 outputs a signal for turning on the switch S900 and the discharge switch Sd900. The timer circuit 944 is formed such that counting of the time is reset each time the potential Vn902 becomes lower than the voltage Vp, and starts counting of 30 ms.

FIG. 15 shows operation timing of the discharge circuit 940 shown in FIG. 14. In (A) of FIG. 15, a solid line indicates a waveform of a voltage VHV of the high voltage input starting terminal HV, and a broken line indicates a value which is 30% of the peak value. In FIG. 15, (B) indicates pulses CP900 outputted form the voltage comparison circuit 943, and (C) indicates an output TMR900 of the timer circuit 944.

As shown in FIG. 15, during a normal period T901, the pulse CP900 is outputted at a cycle corresponding to a cycle of the waveform of the voltage VHV of the high voltage input starting terminal HV. When a plug is pulled out at a timing t902, the pulse CP900 is not outputted from the voltage comparison circuit 943. Then, at a point of time t903 which comes after a lapse of 30 ms from a point of time t901 at which a last pulse is outputted, an output TMR900 of the timer circuit 944 is changed to a high level (H level). Accordingly, the discharge switch Sd900 is turned on and hence, the X capacitor (not shown in the drawing, the X capacitor being connected to an alternating current AC power source) is discharged whereby the voltage VHV of the high voltage input starting terminal HV readily falls.

In this manner, in the prior art described in FIG. 14 and FIG. 15, using the peak hold circuit 942, when the voltage VHV of the high voltage input starting terminal HV (see (A) in FIG. 15) is equal to or below a fixed voltage (indicated by the broken line, a threshold value), pulses CP900 (see (B) in FIG. 15) are outputted from the voltage comparison circuit 943 at the H level. On the other hand, the voltage VHV becomes the fixed voltage or more and the pulses CP900 becomes a low level (L level), and such a time reaches a fixed time (30 ms), the output TMR900 of the timer circuit 944 becomes the H level and hence, the discharge switch Sd900 is turned on and a residual charge of the X capacitor is discharged (see (C) in FIG. 15).

PRIOR ART DOCUMENT

Patent Document

Patent document 1: JP 2016-158310 A

SUMMARY OF THE INVENTION

Problem to be Solved by the Invention

The prior art disclosed in the above-mentioned JP 2016-158310 A is excellent with respect to the point that a residual charge of the X capacitor is discharged.

However, inventors of the present invention have found the following. In the above-mentioned prior art, for example, when a fluctuation of an alternating current AC input voltage is small as in the case of an alternating current AC100V system of a single phase inputting, a residual charge of the X capacitor can be discharged. However, when the fluctuation of the alternating current AC input voltage is large (for example, in the case of a worldwide input voltage), it is difficult to discharge a residual charge of the X capacitor with certainty.

In the case where the fluctuation of the alternating current AC input voltage is large, when an output current of a convertor is small, there is a case where a charge stored in the X capacitor is not sufficiently discharged. In such a case, a high voltage state continues and hence, the pulses CP900 are not generated from the voltage comparison circuit 943. In such a case, it is possible to cope with the problem by adjusting a reduction ratio of the voltage Vth which is obtained by proportionally reducing the voltage Vp held by the peak hold circuit 942 and rising the voltage Vth to a high level. However, when the input supply of an alternating current is interrupted due to removal of a plug at a voltage of Vth or below or the like, the timer circuit 944 cannot count time during which the potential Vn902 is not lower than the voltage Vp and hence, a state is brought about where a residual charge of the X capacitor is not discharged thus giving rise to a possibility that an operator gets an electric shock.

Such a state is liable to occur when a worldwide alternating current AC (voltage) is inputted. The worldwide alternating current AC (voltage) is an alternating current (voltage) used in various places in the world. In various places in the world, an alternating current AC voltage value which is usually used differs depending on a country or a region, or in the same country or in the same region, there is a possibility that an alternating current AC voltage differs or fluctuates. In a case where such worldwide alternating current AC (worldwide alternating current AC being the alternating current AC used in various countries in the world but not necessarily used in the whole world) is inputted, it is particularly necessary to take into account large fluctuation of an alternating current AC voltage. Accordingly, it is important to achieve the above-mentioned task in providing a control circuit or a power source device for discharging.

Accordingly, it is an object of the present invention to provide a control circuit and a power source device (hereinafter, "control circuit and power source device" also being referred to as "control circuit and the like") which can discharge a charge stored in the X capacitor with certainty even when an alternating current input voltage largely fluctuates.

Solution to Problem

[1] A control circuit according to the present invention is a control circuit for controlling a discharge of a capacitor connected between power source lines having different polarities of an alternating current of an AC-DC convertor which receives inputting of the alternating current, converts the alternating current into a direct current, and outputs the direct current, wherein
the control circuit detects a change state of a voltage of the capacitor, and controls the discharge such that a charge stored in the capacitor is discharged based on the change state.

Advantageous effects obtained by such configuration are described later in a column "Advantageous Effects of Invention".

In the above configuration, "alternating current (AC)" means a voltage or a current where directions and a positive and a negative change at a short time interval. As an example of an alternating current power source, a generally-used commercially available power source is named.

In the above configuration, "direct current (DC)" is a voltage or a current where a magnitude and a direction are fixed. A voltage and a current where a magnitude changes but a polarity does not change is also included in a direct current.

In the above configuration, "AC-DC convertor" means an equipment which receives inputting of an alternating current, converts the alternating current into a direct current, and outputs the direct current. As an example of the AC-DC convertor, an AC adaptor of a notebook-type personal computer which receives inputting of an AC commercially available power source and supplies a DC direct current power source and the like are named.

A power source line having different polarities of an alternating current means a power source line which forms different polarities of a power source which supplies an alternating current.

A capacitor connected between the power source lines having different polarities of an alternating current means a so-called X capacitor.

In the above configuration, "a voltage of the capacitor" means a voltage between electrodes of the capacitor (X capacitor) or a voltage (or a potential) on other electrode side using one electrode side of the capacitor (X capacitor) as a reference.

In the above configuration, "detects a change state of a voltage of a capacitor" means the detection whether or not a state of the voltage of the capacitor (X capacitor) changes. For example, when rising or falling of the voltage of the capacitor (X capacitor) is detected, it means that a change of the state of the voltage of the capacitor (X capacitor) is detected, and when rising or falling of the voltage of the capacitor is not detected, it means that no change is detected in the state of the voltage of the capacitor.

[2] In the control circuit according to the present invention, it is preferable that the control circuit perform detection of the change state of the voltage of the capacitor by setting a first voltage obtained by level-shifting the voltage of the capacitor and a second voltage which is increased or decreased from the first voltage, and by performing a comparison operation between a voltage obtained by sample-holding the first or the second voltage every fixed time and the first or the second voltage to which sample-holding is not applied.

In the above configuration, "by level-shifting" a voltage means that a magnitude (or a potential) of an inputted voltage is changed and a changed voltage is outputted. For example, a voltage level of an input voltage of 100 V is lowered to a voltage of several V and the voltage is outputted. With such level-shifting, a comparison operation and the like can be easily performed.

In the above configuration, "a second voltage which is increased or decreased from the first voltage" means a voltage which is increased or decreased from the first voltage by a fixed voltage (for example, a voltage increased or decreased by a voltage such as 0.1 V, 0.2 V, 0.3 V or the like from the first voltage), a voltage obtained by multiplying the first voltage by a fixed coefficient (for example, a voltage obtained by multiplying the first voltage by 0.95, 0.9, 0.85, 0.8 or the like), or a voltage obtained by multiplying the first voltage by a fixed coefficient and further by subtracting a fixed voltage and the like.

In the above configuration, "sample-holding" means sampling (storing) a voltage at a predetermined portion every fixed time and holding the voltage value.

In the above configuration, "comparison operation" means comparing a voltage obtained by sample-holding with a voltage to which sample-holding is not applied and outputting a comparison result (performing true or false outputting), outputting a differential voltage between these voltages and the like.

By performing such an operation, a comparison operation between the voltage obtained by sample-holding and a voltage to which sample-holding is not applied is performed and hence, the interruption of inputting of an AC can be accurately detected. Further, as a capacitor necessary for holding a charge, it is sufficient to provide a capacitor having a small capacitor compared to a case where peak holding is performed (a case where a peak value is held) as the prior art and hence, the control circuit and the like can be down-sized.

[3] In the control circuit according to the present invention, it is preferable that the comparison operation performed by the control circuit be a comparison operation which compares and detects a magnitude relationship of the voltage obtained by sample-holding and the voltage to which sample-holding is not applied or a comparison operation which outputs a voltage difference.

In the above configuration, "a comparison operation which outputs a voltage difference" means, for example, a comparison operation which generates an output which corresponds to a difference between the voltages to be compared.

With such an operation, it is sufficient that the comparison operation performed by the control circuit be an operation which compares and detects a magnitude relationship between the voltage obtained by sample-holding and the voltage to which sample-holding is not applied or an operation which outputs a voltage difference and hence, the interruption of inputting of an AC can be more simply and accurately detected.

[4] In the control circuit according to the present invention, it is preferable that the control circuit perform detection of the change state of the voltage of the capacitor by detecting, assuming voltage values of the first voltage, the second voltage, and a voltage obtained by sample-holding one of the first or the second voltage as a first voltage characteristic line, a second voltage characteristic line and a sample hold voltage characteristic line which are expressed with a lapse of time respectively, an intersection between the sample hold voltage characteristic line and the voltage characteristic line of the voltage to which sample-holding is not applied out of the first and the second voltages.

In the above configuration, "perform detection of the change state of the voltage of the capacitor by detecting, . . . , an intersection between the sample hold voltage characteristic line and the voltage characteristic line of the voltage to which sample-holding is not applied . . . " means, for example, the following. By detecting that both voltage characteristic lines intersect with each other, a normal change state of a voltage of the capacitor (X capacitor), that is, a state where an alternating current input is normally supplied is detected. On the other hand, when it is not possible to detect that both voltage characteristic lines intersect with each other (when it is detected that both voltage characteristic lines do not intersect with each other), an abnormal change state of a voltage of the capacitor (X capacitor), that is, a state where an alternating current input is not normally supplied (a state where the supply of an alternating current input is interrupted) is detected. In this manner, the detection of a change stage of a voltage of the capacitor is performed by detecting the intersection between the voltage characteristic lines.

With such an operation, a change state of a voltage of the X capacitor is detected based on an intersecting state of a plurality of voltage characteristic lines and hence, the interruption of inputting of an alternating current AC can be detected more accurately.

[5] In the control circuit according to the present invention, it is preferable that the control circuit perform the detection of the change state of the voltage of the capacitor by comparing an output obtained by performing a comparison operation between a voltage obtained by sample-holding a first voltage obtained by level-shifting the voltage of the capacitor and the first voltage to which sample-holding is not applied with a reference voltage.

With such an operation, a change state of a voltage of the capacitor can be detected using one voltage (the first voltage).

[6] In the control circuit according to the present invention, it is preferable that the control circuit, when a state that there is no change in the change state continues for a fixed period is detected, control the discharge such that a charge stored in the capacitor is discharged.

In the above configuration, "a state that there is no change in the change state continues for a fixed period" means that a state where a voltage of the capacitor is substantially stable and does not change continues for a fixed period.

For example, when inputting of an alternating current AC is interrupted and such a state continues for a fixed period, such a case is "a state that there is no change in the change state continues for a fixed period".

On the other hand, inputting of an alternating current AC is not interrupted and a voltage is rising or falling, such a case is not "a state that there is no change in the change state continues for a fixed period".

In the above configuration, "a fixed period" in "continues for a fixed period" is a period necessary for detecting whether the voltage of the capacitor is rising or falling, or (presence or non-presence of) a state change that a voltage of the capacitor is rising or falling.

For example, usually, a period of one cycle is sufficient for detecting the presence or the non-presence of next rising which comes after detection of rising. However, the detection of a period from an end of rising to a start of next rising may be a period shorter than one cycle, that is, a period of ½ or more of one cycle (for example, a period of ¾ or more of one cycle).

In the same manner, for example, usually, a period of one cycle is sufficient for detecting the presence or the non-presence of next falling which comes after detection of falling. However, the detection of a period from an end of falling to a start of next falling may be a period shorter than one cycle, that is, a period of ½ or more of one cycle (for example, a period of ¾ or more of one cycle).

Usually, a period of one cycle is sufficient for detecting both rising and falling. However, it is sufficient to detect a period from an end of rising to a start of next falling or a period from an end of falling to a start of next rising so that the period may be a period shorter than one cycle. For example, the period may be a period of ¼ or more of one cycle or a period of ½ or more of one cycle.

In the above configuration, "one cycle" may be one cycle of a normal alternating current formed of a sinusoidal wave (a period which is a sinusoidal wave where a negative valley follows a positive crest and ranges from a start of a positive crest to an end of a negative valley or a period which is a sinusoidal wave and ranges from a start of a positive crest to a start of a next positive crest). However, when full-wave rectification is applied to inputting of an alternating current, a negative valley becomes a positive crest and hence, the positive crests continue. Accordingly, a period which is a half of one cycle of a normal alternating current may be set as one cycle (a period ranging from a start to an end of a positive crest formed by full-wave rectification or a period ranging from a start of a positive crest to a start of a next positive crest being set as one cycle). In the embodiments, the latter period is set as one cycle.

With such a configuration, a charge stored in the X capacitor can be discharged with more certainty.

[7] In the control circuit according to the present invention, it is preferable that the control circuit perform detection that a state that there is no change in the change state continues for a fixed period by counting a time of the state that there is no change in the change state.

Counting of a time of a state that there is no change in the change state of the voltage of the capacitor is performed such that, for example, counting of a time is started, for example, using a point of time that the change state of the voltage of the capacitor changes as a reference, and when a next change is detected, the counting of the time is reset and is again started. When the time reaches "fixed time (period)" before the next change is detected, "a state that there is no change in the change state continues for a fixed period" is brought about.

As a unit for counting time, for example, a timer which counts time, a counter which counts the number of clock pulses which become the reference for synchronization of the control circuit and the like can be named.

With such a configuration, "a state that there is no change in the change state continues for a fixed period" can be detected more easily.

[8] In the control circuit according to the present invention, it is preferable that the control circuit detect a change state of at least one of rising or falling of the voltage of the capacitor, and control the discharge such that a charge stored in the capacitor is discharged based on the change state.

With such a configuration, the change state can be detected by detecting the change state of at least one of rising and falling of the voltage of the capacitor and hence, the interruption of inputting of an alternating current AC can be more easily detected.

[9] In the control circuit according to the present invention, it is preferable that the control circuit detect the change state of rising of the voltage of the capacitor, and control the discharge such that a charge stored in the capacitor is discharged based on the change state.

[10] In the control circuit according to the present invention, it is preferable that the control circuit include:
a first voltage generating unit which generates the first voltage obtained by level-shifting the voltage of the capacitor connected between the power source lines having different polarities;
a second voltage generating unit which generates a second voltage smaller than the first voltage;
a sample hold unit for sample-holding the first or the second voltage, the sample hold unit having: a sample hold capacitor for the first or the second voltage; and a sample hold switch disposed between the first or the second voltage generating unit and the sample hold capacitor;
a comparison operation unit which detects the change state by performing a comparison operation between a sample hold voltage obtained by sample-holding by the sample hold unit out of the first and the second voltages and the voltage to which sample-holding is not applied out of the first and the second voltages; and
a discharge unit which discharges a charge stored in the capacitor connected between the power source lines having different polarities based on the detected change state.

[11] In the control circuit according to the present invention, it is preferable that the control circuit include:
a first voltage generating unit which generates the first voltage obtained by level-shifting the voltage of the capacitor connected between the power source lines having different polarities;
a sample hold unit for the first voltage, the sample hold unit having: a sample hold capacitor for the first voltage; and a sample hold switch disposed between the first voltage generating unit and the sample hold capacitor;
a comparison operation unit which detects the change state by comparing an output calculated based on a sample hold voltage for the first voltage obtained by sample-holding the first voltage by the sample hold unit and the first voltage to which sample-holding is not applied by the sample hold unit with a reference voltage; and
a discharge unit which discharges a charge stored in the capacitor connected between the power source lines having different polarities based on the detected change state.

[12] A power source device according to the present invention includes:
an AC-DC convertor which receives inputting of an alternating current and outputs a direct current;
a capacitor connected between power source lines having different polarities of the alternating current; and
any one of the control circuits described above which controls a discharge of the capacitor.

Advantageous Effects of Invention

According to the present invention, the control circuit detects the change state of the voltage of the capacitor (X capacitor), and controls the discharge such that a charge stored in the capacitor is discharged based on the change state. Accordingly, even when an input voltage largely fluctuates, a charge stored in the capacitor can be discharged with certainty.

DETAILED DESCRIPTION OF THE PREFERRED EMBODIMENTS

Hereinafter, a control circuit and the like of the present invention are described based on embodiments shown in drawings. The respective drawings are schematic views, and do not always strictly reflect actual circuits, timing charts and the like. The circuits, the timing charts and the like of the respective embodiments are illustrated for an exemplifying purpose, and the present invention is not limited by these circuits and the like.

Further, in this specification, symbols used in one drawing have the same meaning also in other drawings. When symbols used in one drawing are also used in other drawings, meanings of the symbols are same. Elements, circuits and the like to which the same symbols are given acquire substantially the same manner of operation and advantageous effects even when the embodiments differ from each other. The repeated description of the components having the same symbol is omitted as much as possible.

Embodiment 1

(1) Summary

First, a power source device 101 (and a control circuit 11 of the power source device 101) according to an embodiment 1 are described with reference to FIG. 1 to FIG. 3.

The power source device 101 (and the control circuit 11 of the power source device 101) according to the embodiment 1 detects a change state of the increase of a voltage of a capacitor (X capacitor), and controls a discharge such that a charge stored in the capacitor (X capacitor) is discharged based on the detected change state.

Figure 1:
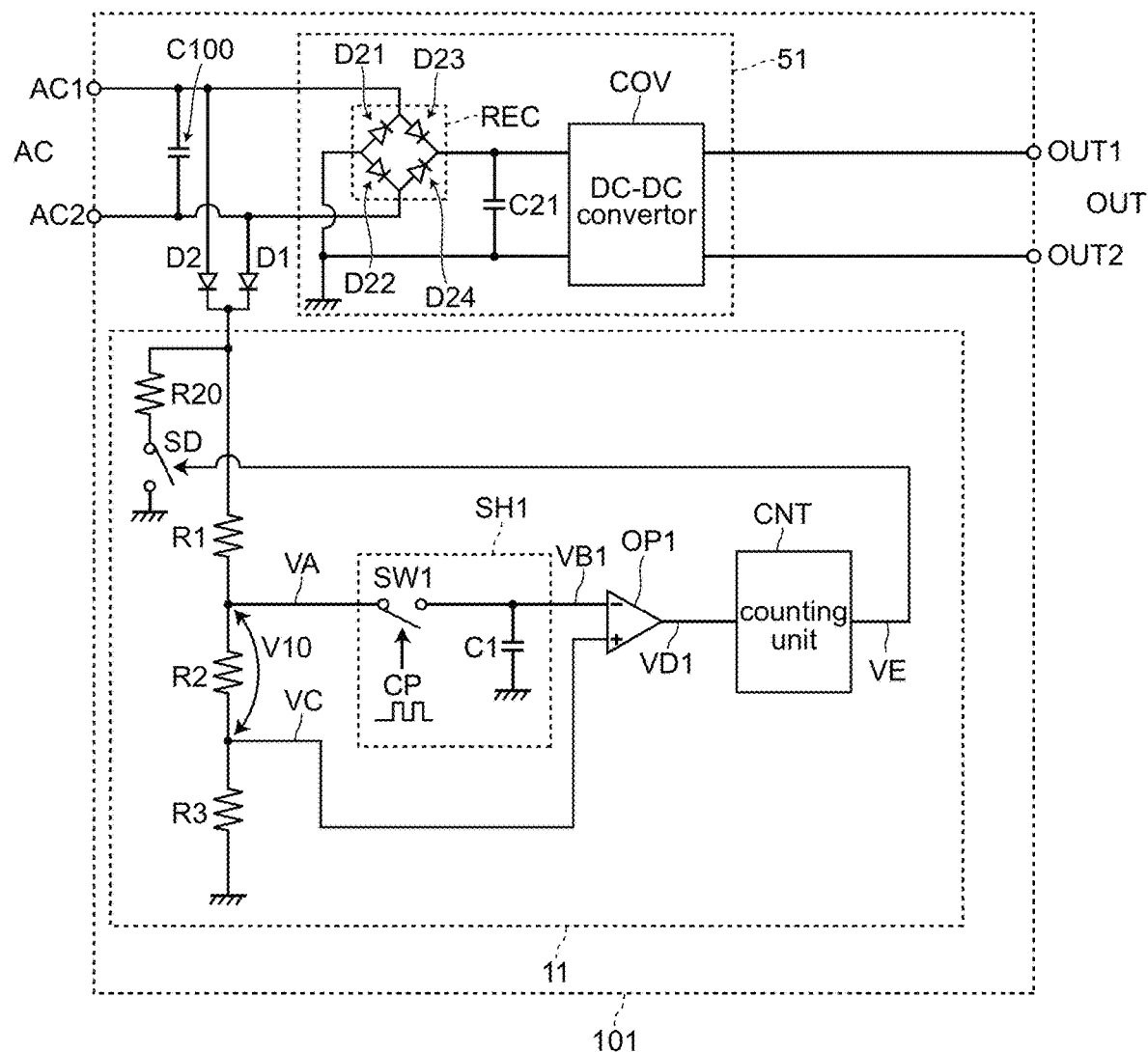
FIG. 1 is a view for describing the circuit configuration of a power source device 101 (and a control circuit 11 of the power source device 101) according to an embodiment 1.

FIG. 1 is a view for describing the circuit configuration of the power source device 101 (and the control circuit 11 of the power source device 101) according to the embodiment 1. FIG. 2 is a view showing an operation timing chart of the power source device 101 (and the control circuit 11 of the power source device 101) according to the embodiment 1.

Figure 2:
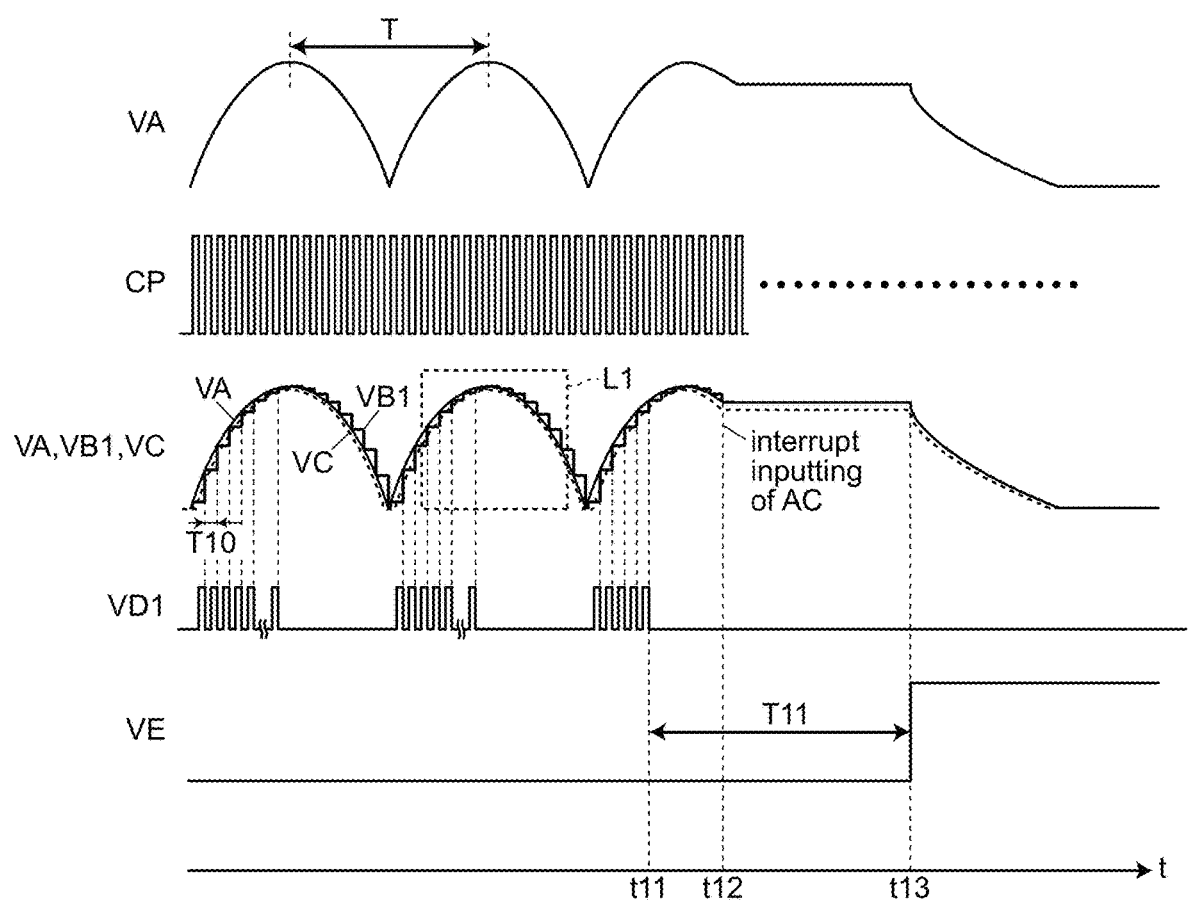
FIG. 2 is a view for describing operation timing of the power source device 101 (and the control circuit 11 of the power source device 101) according to the embodiment 1.
Figure 3:
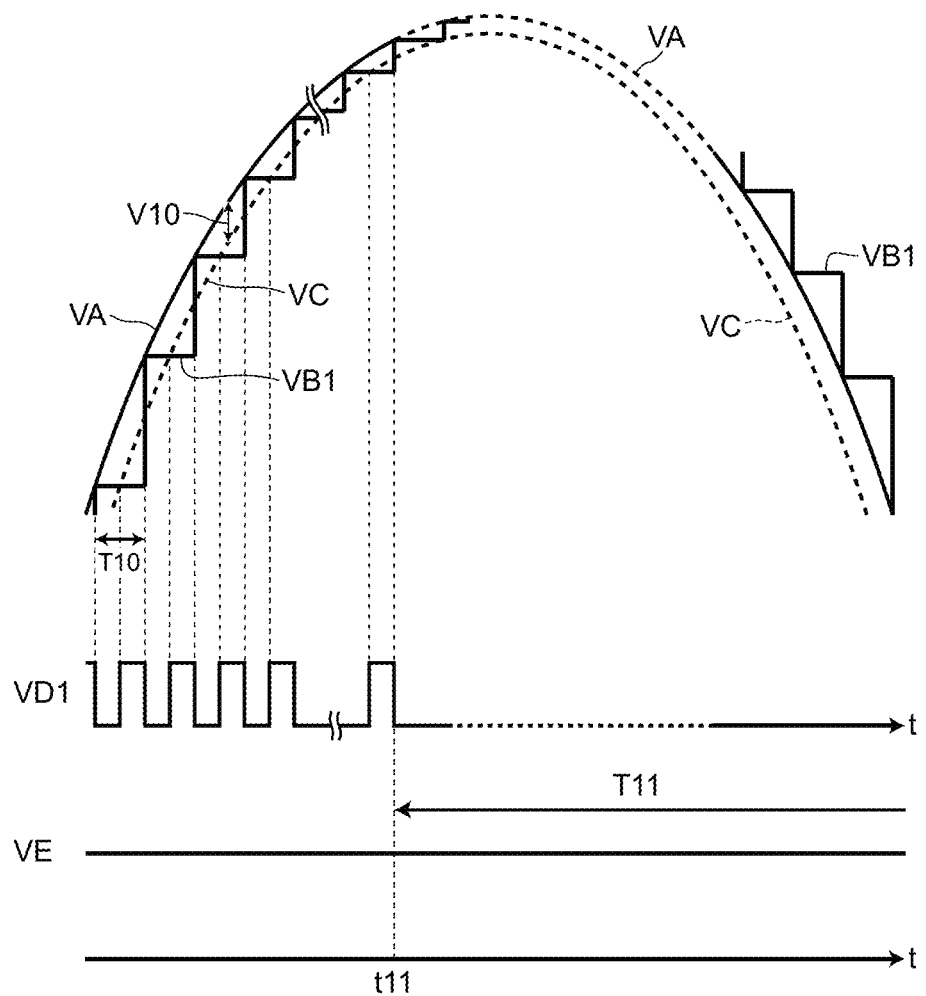
FIG. 3 is a view for describing a portion (L1 portion) shown in FIG. 2 in an enlarged manner.

FIG. 3 is a view for describing a portion (L1 portion) shown in FIG. 2 in an enlarged manner.

As shown in FIG. 1, the power source device 101 includes: a capacitor (X capacitor) C100 which is connected between input terminals AC1, AC2 of an alternating current AC (alternating current input power source) (between power source lines having different polarities); an AC-DC convertor 51 which converts an alternating current AC into a direct current DC and outputs a direct current output OUT to output terminals OUT1, OUT2; and the like.

The AC-DC convertor 51 has: a rectifier circuit REC which rectifies an alternating current AC; a DC-DC convertor COV which receives inputting of an output (direct current) of the rectifier circuit REC and outputs a direct current output (voltage) OUT; and a smoothing capacitor C21 provided on an input side of the DC-DC convertor COV.

The rectifier circuit REC which is formed of four diodes D21, D22, D23 and D24 is inserted between the AC input terminals AC1, AC2 (between the power source lines having different polarities), and full-wave rectification of an inputted AC is performed. A cathode of the diode D21 and an anode of the diode D23 are connected to the input terminal AC1 of an alternating current AC, and a cathode of the diode D22 and an anode of the diode D24 are connected to the input terminal AC2. A cathode of the diode D23 and a cathode of the diode D24 are connected with each other, and are connected to one side of the capacitor C21 and one input terminal of the DC-DC convertor COV. An anode of the diode D21 and an anode of the diode D22 are connected with each other, are connected to the other side of the capacitor C21 and the other input terminal of the DC-DC convertor COV, and are grounded. The capacitor C21 is a smoothing capacitor.

Diodes D1 and D2 are inserted between the alternating current AC and the control circuit 11. That is, anodes of the diodes D2 and D1 are respectively connected to the input terminals AC1 and AC2, and cathodes of the diodes D2 and D1 are connected to each other, and the cathodes of the diodes D2 and D1 are connected to each other and the alternating current AC is inputted to the control circuit 11 (a voltage dividing circuit formed of resistances R1, R2 and R3).

The control circuit 11 includes a voltage dividing circuit, a sample hold circuit SH1, a comparator OP1, a counting unit CNT, and a discharge switch SD (discharge unit). The voltage dividing circuit is formed of resistances R1, R2 and R3 which are connected in series for dividing voltages from the cathodes of the diodes D2 and D1 connected to each other. The sample hold circuit SH1 performs sample-holding of divided voltage VA (a voltage at a connecting portion between the resistances R1 and R2). The comparator OP1 compares a voltage (VB1) outputted from the sample hold circuit SH1 and a voltage VC (a voltage at a connecting portion between the resistances R2 and R3). The counting unit CNT counts a time using a change of a voltage (pulse voltage) VD1 outputted from the comparator OP1 as an initiation point. The discharge switch SD discharges a charge stored in the X capacitor C100 upon receiving a voltage VE at an H level (discharge command) outputted from the counting unit CNT.

Respective units of the circuit are described hereinafter.

As described previously, the voltage dividing circuit is formed of the resistances R1, R2 and R3. By setting a resistance value which is a sum of the resistances R1, R2 and R3 to a high resistance value, power consumption at the voltage dividing circuit is reduced.

A voltage at the connecting portion between the resistances R1 and R2 and a voltage at the connecting portion between the resistances R2 and R3 are voltages VA and VC respectively, and are voltages obtained by level-shifting a voltage of the X capacitor C100. Assuming the voltages VA and VC as a first voltage and a second voltage, the voltage VA (first voltage) is higher than the voltage VC (second voltage) by a voltage V10. In other words, the voltage V10 which is a differential voltage between the voltage VA (first voltage) and the voltage VC (second voltage) is expressed by V10=VA−VC.

The sample hold circuit SH1 has a switch SW1 and a capacitor C1. One side of the switch SW1 is connected to the connecting portion between the resistances R1 and R2 in the voltage dividing circuit, and the other side of the switch SW1 is connected to one side of the capacitor C1 and an inverted input terminal (−) of the comparator OP1. The other side of the capacitor C1 is grounded.

The switch SW1 is a switch for sampling a voltage (voltage VA) at the connecting portion between the resistances R1 and R2, and the capacitor C1 is a capacitor for holding the sampled voltage VA. The switch SW1 is turned on or off in synchronism with periodical clock pulses CP. When the clock pulse CP becomes an H level so that the switch SW1 is turned on, the switch SW1 is brought into a closed state and becomes conductive. When the clock pulse CP becomes an L level so that the switch SW1 is turned off, the switch SW1 is brought into an open state and becomes non-conductive. When the switch SW1 is turned on, the voltage (voltage VA) at the connecting portion between the resistances R1 and R2 is sampled. When the switch SW1 is turned off, the switch SW1 becomes non-conductive and the sampled voltage VA is held by the capacitor C1. It is preferable that at least a plurality of clock pulses CP exist in half period of the voltage VA.

The connecting portion between the resistances R2 and R3 is connected to a non-inverted input terminal (+) of the comparator OP1. One side of the capacitor C1 is connected to the inverted input terminal (−) for enabling inputting of an output of the sample hold circuit SH1.

The comparator OP1 detects a change state of the voltage VA (first voltage) by performing a comparison operation between a voltage VB1 which is obtained by sample holding and is applied to the inverted input terminal (−) (hereinafter, also referred to as "sample hold voltage VB1") and a voltage VC at the non-inverted input terminal (+). When the voltage VC (second voltage) at the non-inverted input terminal (+) is larger than the voltage VB1 at the inverted input terminal (−), an outputted voltage VD1 becomes a high level (H level), and when the voltage VC (second voltage) at the non-inverted input terminal (+) is smaller than the voltage VB1 at the inverted input terminal (−), the outputted voltage VD1 becomes a low level (L level).

The counting unit CNT receives inputting of the voltage VD1 outputted from the comparator OP1, and counts a time using a point of time that the voltage VD1 changes as a reference, and a voltage VE becomes an H level when a fixed time is counted. That is, the voltage VE outputted from the counting unit CNT, when a change of inputting of an alternating current AC (a change of the voltage VA) is not present for a fixed time or more, becomes an H level from an L level so that a discharge command is outputted so as to turn on the discharge switch SD (making the discharge switch SD conductive) and hence, a charge stored in the X capacitor C100 is discharged.

The discharge switch SD is a switch disposed between the cathodes of the diodes D1 and D2 and a ground, and one side of the discharge switch SD is connected to the cathodes of the diodes D1 and D2 via a discharge resistance R20, and the other side of the discharge switch SD is grounded. In a normal state where the supply of an alternating current AC is not interrupted, the voltage VE is at an L level so that the switch SD is in an open state (a non-connection state). When the supply of the alternating current AC is interrupted, and such a state is detected, the voltage VE becomes an H level so that the discharge switch SD is turned on (becoming conductive). Accordingly, a charge stored in the X capacitor C100 is discharged to a ground side via the resistance R20 (for discharging) and the switch SD.

FIG. 2 is a view for describing operation timing of the power source device 101 (and the control circuit 11 of the power source device 101) according to the embodiment 1.

At an uppermost portion of FIG. 2, a voltage characteristic line of a voltage VA which indicates the voltage VA with a lapse of time is shown. The voltage characteristic line of the voltage VA is subjected to full-wave rectification by the diodes D1 and D2, and depicts a waveform formed of crest-shaped sinusoidal halfwave curves. With respect to the waveform of the voltage VA, at a point of time t12 where the third crest-shaped waveform counted from the left side slightly falls is a point of time that the supply of an alternating current AC is interrupted due to disconnection of cables for inputting an alternating current AC from outlets (a state where the input terminals AC1, AC2 are disconnected from the outlets) or the like. Also in this case, a charge is stored in the X capacitor C100 and hence, even after the point of time t12, the voltage VA substantially does not change and maintains a fixed voltage until a point of time t13 at which the charge is discharged. A voltage of the voltage VA is lowered due to the discharge.

Clock pulses CP are shown at a second stage from the top in FIG. 2. The clock pulses CP are pulses which become a basis of control timing of the entire control circuit 11. The clock pulses CP are signals which periodically take a state where a voltage is high (H level) and a state where the voltage is low (L level). In the embodiment 1, the clock pulses CP are used for timing of sample-holding performed by the sample hold circuit SH1. It is preferable that a plurality of clock pulses exist within a rising period or a falling period (a half cycle) of one crest-shaped waveform (one cycle T) of the voltage VA (first voltage). The clock pulses CP can be also used as counter pulses of the counting unit (using the clock pulses CP as pulses for counting).

In a third stage from the top in FIG. 2, voltage characteristic lines which express the voltage VA, the voltage VB1 (the voltage obtained by sample-holding the voltage VA) and the voltage VC (the voltage smaller than the voltage VA) with a lapse of time are shown in a superposed manner. The voltage VB1 characteristic line and the voltage VC characteristic line intersect with each other plural times during rising of the voltage VA (a portion on a left side of the crest-shaped waveform). On the other hand, the voltage VB1 characteristic line and the voltage VC characteristic line do not intersect with each other during falling of the voltage VA (a portion on a right side of the crest-shaped waveform). After the point of time t12 at which inputting of the alternating current AC is interrupted and the voltage VA no more changes, there is no possibility that a magnitude relationship between the voltages VB1, VC changes. The voltage characteristic lines of the voltages VA, VB1 and VC are shown in an enlarged manner in FIG. 3.

A timing chart of the voltage VD1 outputted from the comparator OP1 is shown at a fourth stage from the top in FIG. 2. The voltage VD1 outputted from the comparator OP1 is inverted each time the magnitude relationship between the voltage VB1 (the voltage obtained by sample-holding the voltage VA) and the voltage VC at the connecting portion between the resistances R2 and R3 (the voltage smaller than the voltage VA) is reversed. The voltage VD1 outputted from the comparator OP1 is outputted as a plurality of pulses during rising of the voltage VA (the portion on the left side of the crest-shaped waveform). On the other hand, during falling of the voltage VA (the portion on the right side of the crest-shaped waveform), a pulse-shaped voltage VD1 is not outputted.

Although the voltage VD1 is outputted as pulses until a rising portion of the third crest counted from the left side with respect to the voltage VA (until the point of time t11), after the point of time t11, the magnitude relationship between the voltage VB1 and the voltage VC is not reversed and hence, the voltage VD1 is not outputted as pulses (the voltage being held at the L level).

A timing chart of the voltage VE outputted from the counting unit CNT is shown at a fifth stage from the top in FIG. 2.

The voltage VD1 outputted from the comparator OP1 is inputted to the counting unit CNT. The counting unit CNT resets counting when the counting unit CNT detects falling of the voltage VD1 from an H level to an L level, and starts counting (point of time t11). A predetermined time T11 is set in advance in the counting unit CNT. When the counting unit CNT starts counting of time from the point of time t11 and no change occurs in the voltage VD1 before the time reaches the predetermined time T11, the voltage VE at a point of time t13 which comes after a lapse of the predetermined time T11 from the point of time t11 is shifted from the L level to the H level so that the discharge switch SD is turned on. Accordingly, a charge stored in the X capacitor C100 is discharged via the diode D1 (D2), the resistance R20 and the switch SD.

The voltage VE (the voltage at the H level) outputted from the counting unit CNT is a discharge command signal. When the discharge command signal is outputted (the voltage VE becomes the H level) at the point of time t13, the discharge switch SD is turned on (becomes conductive), and a charge stored in the X capacitor C100 is discharged. Along with such discharging of the charge, the voltage VA and the voltage VC gradually fall.

A MOSFET element is used as the switches SD and SW1 (a MOSFET element is used as switches in other embodiments described hereinafter).

FIG. 3 is a view for describing a portion shown in FIG. 2 in an enlarged manner.

The voltage VA is a voltage (first voltage) obtained by level-shifting a voltage of the X capacitor C100. The voltage VB1 is a voltage obtained by sample-holding the voltage VA (first voltage). The voltage VC is a second voltage smaller than the voltage VA (first voltage) (the voltage VC being smaller than the voltage VA by a voltage V10 during rising of the voltage VA in a waveform).

A line indicated by symbol VA is a first voltage characteristic line which expresses the voltage VA (first voltage) with a lapse of time.

A line indicated by symbol VC is a second voltage characteristic line which expresses the voltage VC (second voltage) with a lapse of time.

A line indicated by symbol VB1 is a sample hold voltage characteristic line which expresses the voltage VB1 (a voltage obtained by sample-holding the first voltage VA) with a lapse of time.

The sample hold voltage characteristic line of the voltage VB1 which expresses the voltage VB1 obtained by sample-holding the voltage VA with a lapse of time takes a stepwise waveform since the sample hold circuit SH1 repeats sampling of the voltage VA and holding the voltage VA in the capacitor C1 at a cycle T10. During rising of the voltage VA, the sample hold voltage VB1 characteristic line touches the voltage VA characteristic line at some points of time, and is positioned below the voltage VA characteristic line at other points of time. On the other hand, during falling of the voltage VA, the sample hold voltage VB1 characteristic line touches the voltage VA characteristic line at some sample timings, and is positioned above the voltage VA characteristic line at other pints of time.

In the embodiment 1, when the input supply of an alternating current AC is normal without interruption, whether or not inputting of the alternating current AC is interrupted is detected by making use of an intersection between the voltage characteristic line of the voltage VC and the sample hold voltage characteristic line of the voltage VB1 obtained by sample-holding the voltage VA during rising of the voltage VA.

By adjusting a magnitude of the voltage V10 which is a differential voltage between the voltage VA and the voltage VC, a length of the cycle T10 or the like, the adjustment is made such that the voltage VC characteristic line and the sample hold voltage VB1 characteristic line intersect with each other at least once during rising of the voltage VA when the input supply of the alternating current AC is normal without interruption. When the adjustment is made such that the voltage VC characteristic line and the sample hold voltage VB1 characteristic line intersect with each other plural times, the intersection can be detected more accurately.

On the other hand, during falling of the voltage VA, the sample hold voltage VB1 characteristic line is positioned above the voltage VA characteristic line and hence, there is no possibility that the sample hold voltage VB1 characteristic line intersects with the voltage VC characteristic line.

The comparator OP1 performs a comparison operation of a magnitude relationship between the voltage VC and the sample hold voltage VB1. When the input supply of the alternating current AC is normal without interruption, the voltage VC characteristic line and the sample hold voltage VB1 characteristic line intersect with each other. In this case, the voltage VD1 is inverted each time the voltage VC characteristic line and the sample hold voltage VB1 characteristic line intersect with each other. Such a mode is shown in FIG. 3 in an enlarged manner.

During a period where the voltage VA is rising, when the voltage VC is larger than the sample hold voltage VB1, the voltage VD1 outputted from the comparator OP1 becomes an H level. When the voltage VC characteristic line and the sample hold voltage VB1 characteristic line intersect with each other, and the voltage VC becomes smaller than the sample hold voltage VB1, the voltage VD1 outputted from the comparator OP1 is inverted from the H level to an L Level. When the voltage VC characteristic line and the sample hold voltage VB1 characteristic line intersect with each other again, and the voltage VC becomes larger than the sample hold voltage VB1, the voltage VD1 outputted from the comparator OP1 is inverted from the L level to the H level.

In this manner, during the period where the voltage VA is rising, the voltage VD1 outputted from the comparator OP1 repeats the inversion of the voltage between the H level and the L level.

According to the control circuit 11 of the above-mentioned embodiment 1, even when an alternating current AC input voltage largely fluctuates, a change state of rising of the voltage of the X capacitor C100 can be detected, and a discharge is controlled such that a charge stored in the X capacitor C100 is discharged based on the change state. Accordingly, the charge stored in the X capacitor C100 can be discharged with certainty.

Comparison with Prior Art

Figure 14:
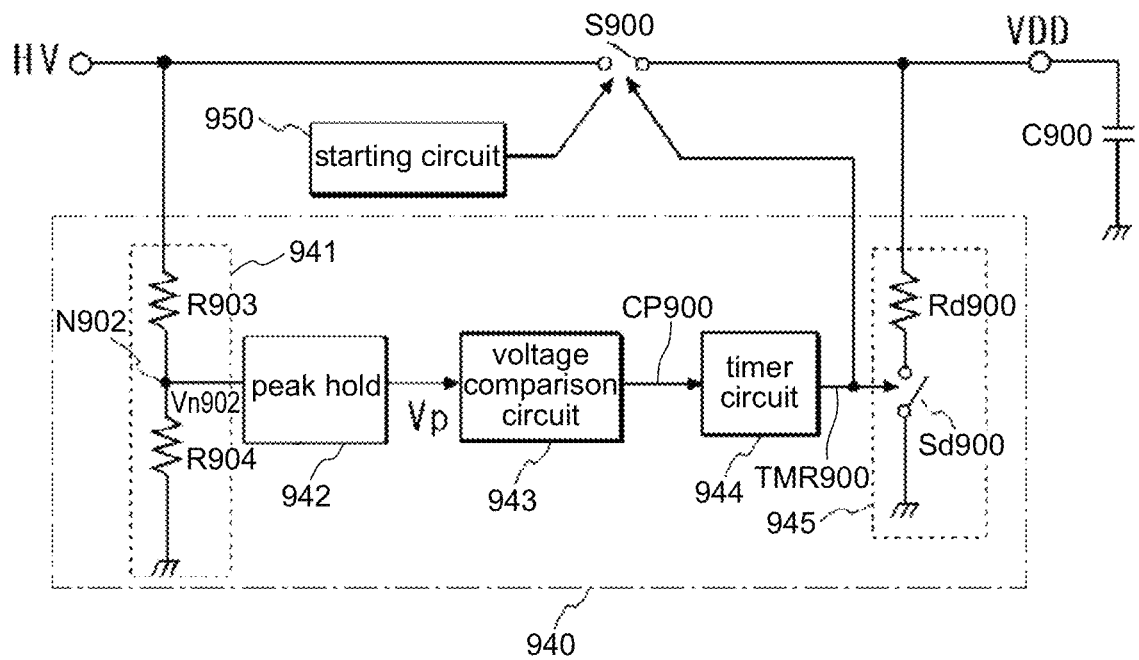
FIG. 14 is a view for describing a discharge circuit of a conventional power source device.
Figure 15:
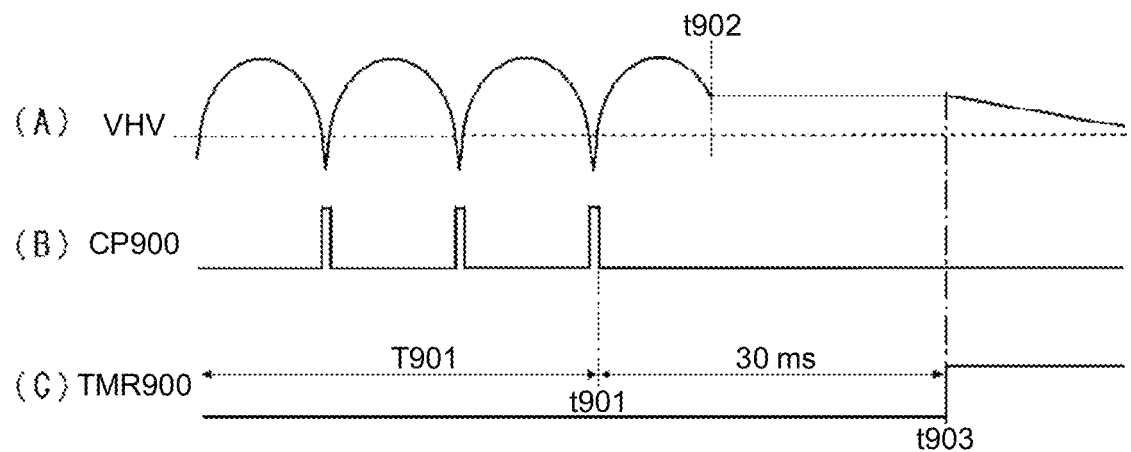
FIG. 15 is a view for describing operation timing of the circuit shown in FIG. 14.

In the prior art described using FIG. 14 and FIG. 15, when the voltage VHV is set low, pulses CP900 are not generated depending on a load condition or a circuit condition so that there is a possibility that an erroneous detection occurs. This is because, for example, when a load is light and a capacitance of a filter capacitor inputted to an input part is large, with respect to a waveform of the voltage VN902 at a portion of the connection node N902, a pulsation voltage of an alternating current AC or a voltage of a valley portion of the pulsation current cannot be lowered and becomes high.

Further, if the voltage VHV is set high so as to avoid the above-mentioned erroneous detection, when an input voltage is high (when a voltage is high in a worldwide input voltage), a charge is not discharged depending on the AC input stop timing and hence, a residual voltage of the X capacitor is increased thus giving rise to a risk that an operator gets an electric shock.

On the other hand, in the embodiment 1, a discharge is controlled such that a change state of rising of the voltage of the X capacitor C100 is detected, and a charge stored in the X capacitor C100 is discharged based on the change state. Accordingly, a risk that an operator gets an electric shock, which is generated when a voltage VHV obtained by proportionally reducing a peak hold voltage is high, due to a residual charge of the X capacitor is low.

Further, the voltage VHV obtained by proportionally reducing the peak hold voltage is not used for detecting a change state of the voltage of the X capacitor C100 and hence, a possibility of the occurrence of a phenomenon that the pulses CP900 are not generated when setting of the voltage VHV is low so that an erroneous detection occurs can be lowered.

Accordingly, a residual charge of the X capacitor C100 can be discharged with certainty.

In the prior art, it is necessary to peak-hold an alternating current AC voltage peak value for reflecting the alternating current AC voltage peak value to a VHV threshold value. In this case, a capacitor having a large capacitance is necessary in general. Accordingly, in integrating a control circuit, there exist several drawbacks including the following drawbacks.

(1) In an attempt to dispose a peak hold capacitor in an integrated chip, a chip size of an integrated circuit is increased.

(2) When a peak hold capacitor is externally mounted on an integrated chip, a terminal for external mounting becomes necessary and hence, a chip size of an integrated circuit is increased.

(3) An externally mounted peak hold capacitor becomes necessary besides an integrated chip and hence, a control circuit and a power source device become large-sized.

On the other hand, in the embodiment 1, it is sufficient to sample-hold a voltage which is obtained by shifting a voltage of the X capacitor C100 connected between the power source lines having different polarities of the alternating current AC power source. Accordingly, in general, as the sample hold capacitor, a capacitor having a small capacity compared to the prior art (peak hold capacitor) can be used. Accordingly, the control circuit can be integrated in a form that the sample hold capacitor is incorporated. Further it is unnecessary to provide a terminal for an external capacitor (peak hold capacitor) to an integrated semiconductor chip. Accordingly, it is possible to further reduce a size of the control circuit and a size of the power source device.

Embodiment 2

The embodiment 1 is an embodiment where a change state of rising of a voltage of the X capacitor C100 is detected. On the other hand, an embodiment 2 is an embodiment where a change state of falling of a voltage of an X capacitor C100 is detected.

A control circuit 12 and the like according to the embodiment 2 are basically same to the control circuit 11 and the like according to the embodiment 1. However, the control circuit 12 and the like according to the embodiment 2 differ from the control circuit 11 and the like according to the embodiment 1 with respect to the following point. That is, in the embodiment 1, the comparator OP1 is used, and a voltage VB1 obtained by sample-holding a voltage VA of the connecting portion between the resistances R1 and R2 is inputted to the inverted input terminal (−) of the comparator OP1, and a voltage VC of the connecting portion between the resistances R2 and R3 is inputted to the non-inverted input terminal (+) (see FIG. 1). In the embodiment 2, a comparator OP2 is used, and a voltage VB2 obtained by sample-holding a voltage VC is inputted to a non-inverted input terminal (+) of the comparator OP2, and a voltage VA is inputted to an inverted input terminal (−) (see FIG. 4).

Hereinafter, the embodiment 2 is described in detail.

Figure 4:
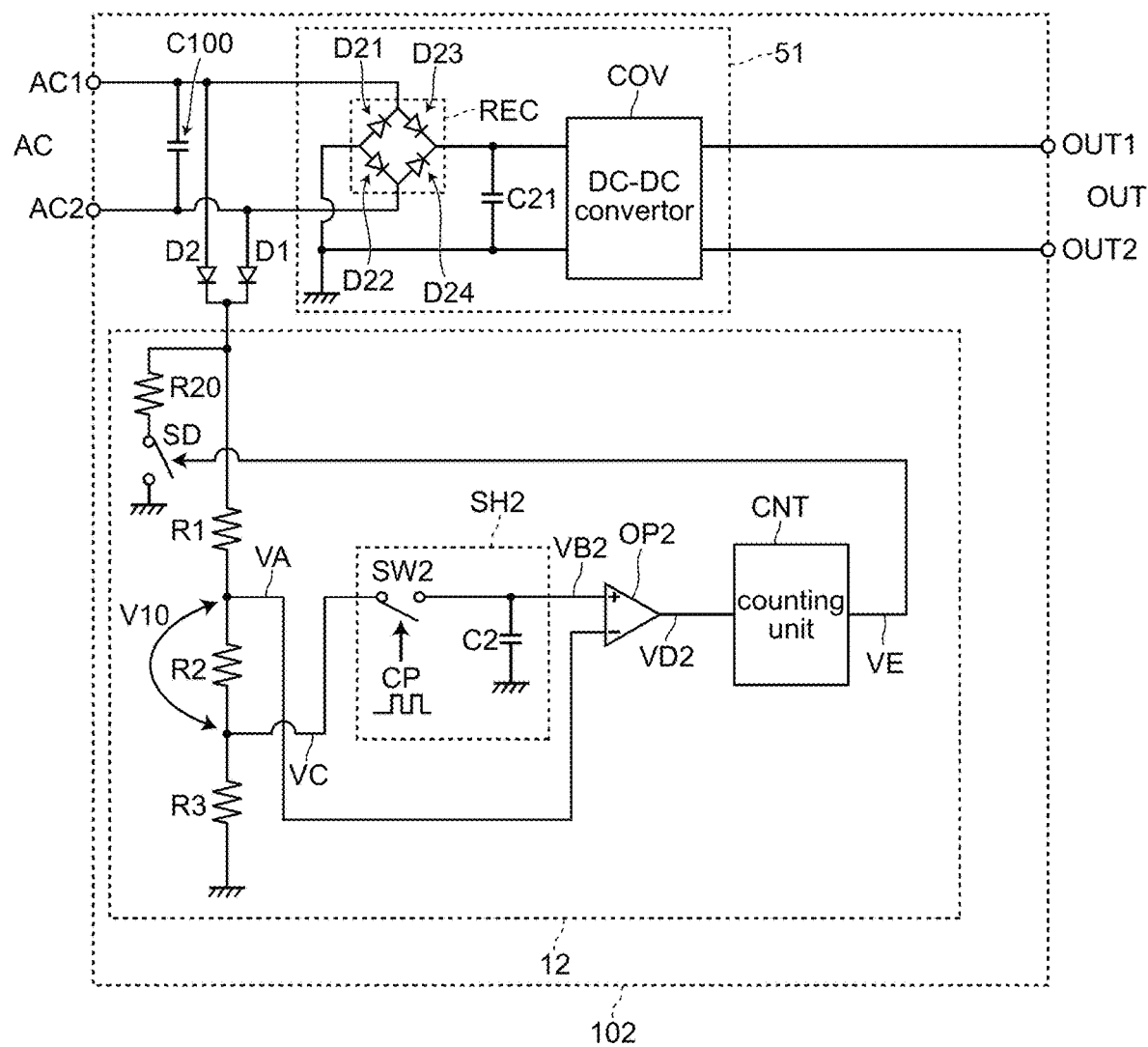
FIG. 4 is a view for describing the circuit configuration of a power source device 102 (and a control circuit 12 of the power source device 102) according to an embodiment 2.
Figure 5:
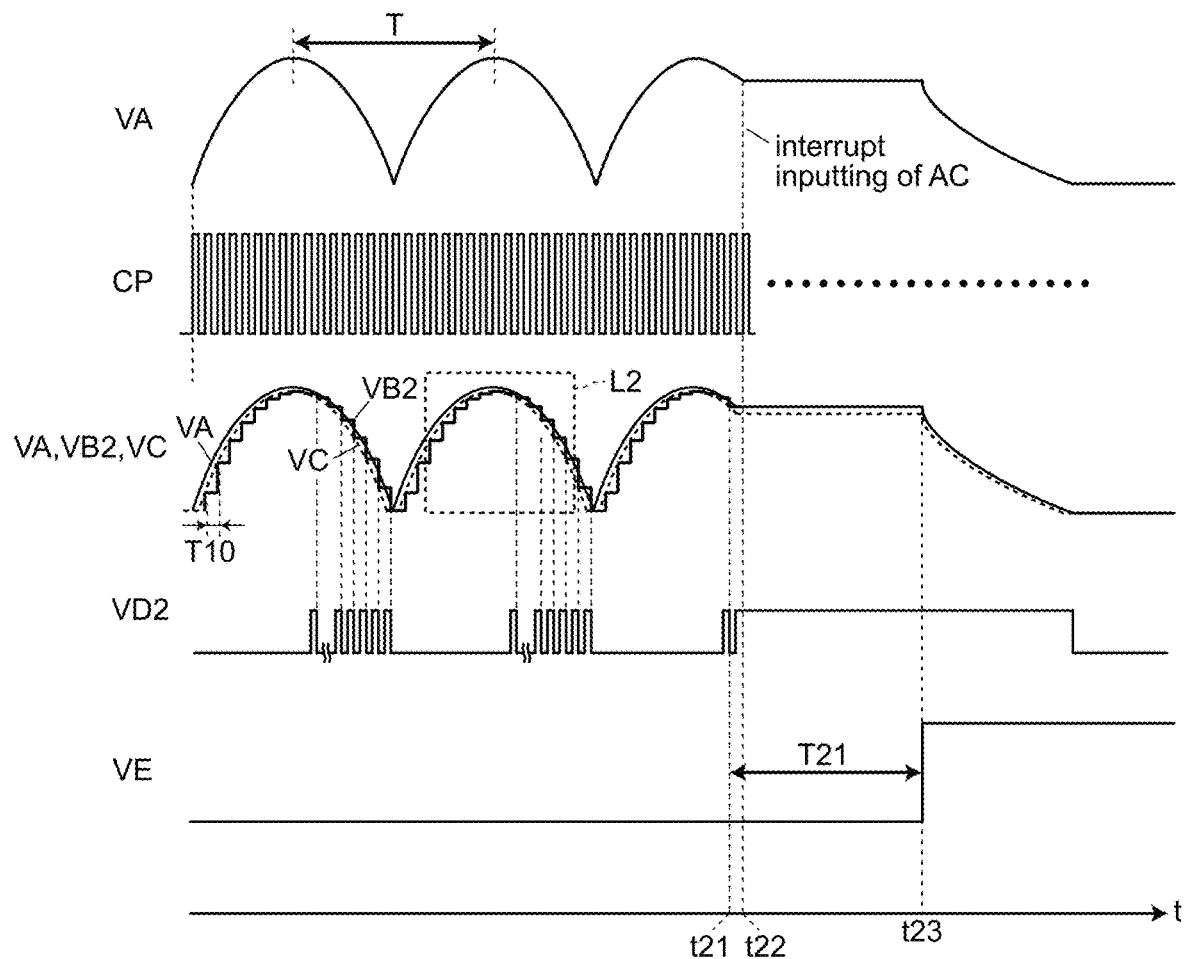
FIG. 5 is a view for describing operation timing of the power source device 102 (and the control circuit 12 of the power source device 102) according to the embodiment 2.
Figure 5:
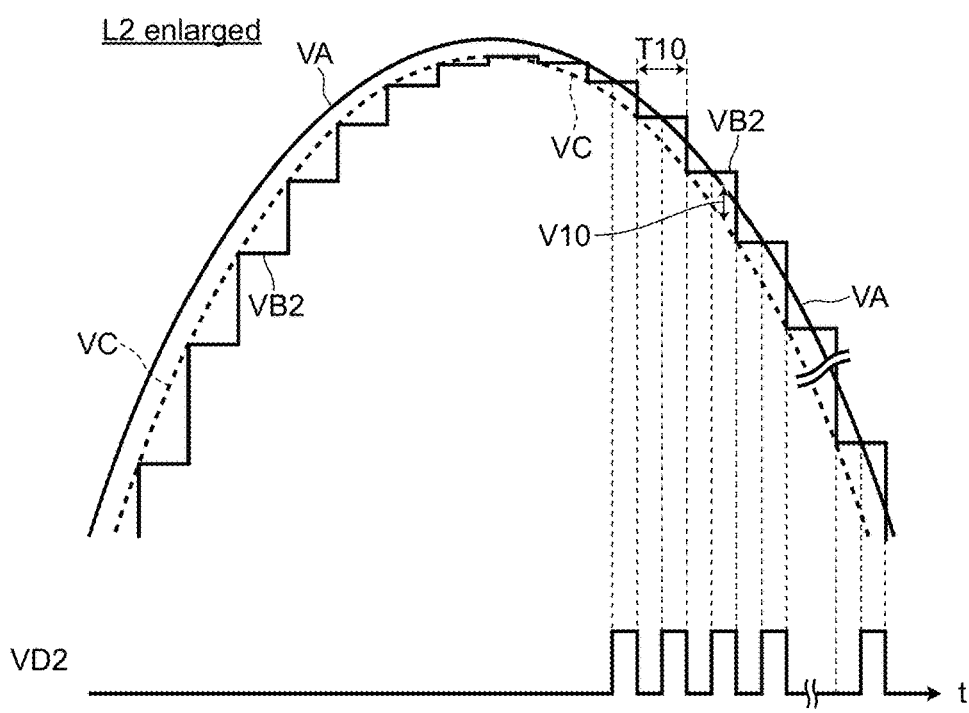

FIG. 4 is a view for describing the circuit configuration of a power source device 102 (and the control circuit 12 of the power source device 102) according to the embodiment 2. FIG. 5 is a view for describing operation timing of the power source device 102 (and the control circuit 12 of the power source device 102) according to the embodiment 2.

A sample hold circuit SH2 such as the control circuit 12 and the like according to the embodiment 2 has a switch SW2 and a capacitor C2 as shown in FIG. 4.

In the sample hold circuit SH2 according to the embodiment 2, the switch SW1 and the capacitor C1 of the sample hold circuit SH1 (see FIG. 1) according to the embodiment 1 are respectively replaced with the switch SW2 and the capacitor C2.

One side of the switch SW2 is connected to a connecting portion between resistances R2 and R3 in a voltage dividing circuit, and the other side of the switch SW2 is connected to one side of the capacitor C2 and the non-inverted input terminal (+) of the comparator OP2. The other side of the capacitor C2 is grounded.

The switch SW2 is a switch for sampling a voltage (voltage VC) at the connecting portion between the resistances R2 and R3, and the capacitor C2 is a capacitor for holding the sampled voltage VC. The switch SW2 is turned on or off in synchronism with periodical clock pulses CP. When the clock pulse CP becomes an H level so that the switch SW2 is turned on, the switch SW2 is brought into a closed state and becomes conductive. When the clock pulse CP becomes an L level so that the switch SW2 is turned off, the switch SW2 is brought into an open state and becomes non-conductive. When the switch SW2 is turned on, the voltage (voltage VC) at the connecting portion between the resistances R2 and R3 is sampled. When the switch SW2 is turned off, the switch SW2 becomes non-conductive, and the sampled voltage VC is held by the capacitor C2.

FIG. 5 is a view for describing operation timing of the power source device 102 (and the control circuit 12 of the power source device 102) according to the embodiment 2.

At an uppermost portion of FIG. 5, a voltage characteristic line of a voltage VA which indicates the voltage VA with a lapse of time is shown.

A point of time t22 is a point of time at which input supply of an alternating current AC is interrupted, and a point of time t23 is a point of time at which discharging from the X capacitor C100 starts.

Clock pulses CP are shown at a second stage from the top in FIG. 5.

In a third stage from the top in FIG. 5, voltage characteristic lines which express the voltage VA, the voltage VB2 (the voltage obtained by sample-holding the voltage VC) and the voltage VC with a lapse of time are shown in a superposed manner. At a lower portion of FIG. 5, a portion L2 of the voltage characteristic lines is enlarged, and is shown as "L2 enlarged" portion.

As shown in "L2 enlarged" portion, the voltage VC characteristic line (dotted line) which falls from the voltage VA by a voltage V10 is depicted below the voltage VA characteristic line (solid line). The voltage VB2 is a voltage obtained by sample-holding the voltage VC, and takes a stepwise waveform.

The sample hold voltage VB2 characteristic line which expresses the voltage VB2 obtained by sample-holding the voltage VC with a lapse of time takes a stepwise waveform since the sample hold circuit SH2 repeats sampling of the voltage VC and holding the voltage VC in the capacitor C2 at a timing of a cycle T10. During rising of the voltage VA (or the voltage VC), the sample hold voltage VB2 characteristic line touches the voltage VC characteristic line at some sample timings (points of time), is positioned below the voltage VC characteristic line at other points of time, and does not intersect with the voltage VA characteristic line. On the other hand, during falling of the voltage VA (or the voltage VC), the sample hold voltage VB2 characteristic line touches the voltage VC characteristic line at some sample timings (points of time), is positioned above the voltage VC characteristic line at other pints of time, and intersects with the voltage VA characteristic line plural times.

A timing chart of a voltage VD2 outputted from the comparator OP2 is shown at a fourth stage from the top in FIG. 5.

The comparator OP2 performs a comparison operation of a magnitude relationship between the voltage VA and the sample hold voltage VB2, and outputs the result as the voltage VD2. The voltage VD2 is inverted (an H level and an L level are inverted) each time the magnitude relationship between the voltage VA and the sample hold voltage VB2 is changed.

Since the comparator OP2 performs the operation in this manner, during a period where the voltage VA is rising, there is no possibility that the voltage VA and the sample hold voltage VB2 intersect with each other. That is, there is no possibility that the magnitude relationship is reversed. Accordingly, the voltage VD2 outputted from the comparator OP2 is held at the L level and does not change.

On the other hand, during a period where the voltage VA is falling, the voltage VA and the sample hold voltage VB2 intersect with each other. That is, the magnitude relationship is reversed. Accordingly, and hence, the voltage VD2 outputted from the comparator OP2 is inverted along with such intersection.

This mode is shown in the lower portion of FIG. 5 ("L2 enlarged" portion) in an enlarged manner.

A timing chart of a voltage VE outputted from a counting unit CNT is shown at a fifth stage from the top in FIG. 5.

As shown in FIG. 4, the voltage VD2 outputted from the comparator OP2 is inputted to the counting unit CNT. The counting unit CNT resets counting when the counting unit CNT detects falling of the voltage VD2 from an H level to an L level, and starts counting (point of time t21). A predetermined time T21 is set in advance in the counting unit CNT. When the counting unit CNT starts counting of time from the point of time t21 and no change occurs in the voltage VD2, the voltage VE, outputted at the point of time t23 which comes after a lapse of the predetermined time T21 from the point of time t21, is shifted from the L level to the H level so that a discharge switch SD is turned on. Accordingly, a charge stored in the X capacitor C100 is discharged.

The voltage VE (the voltage at the H level) outputted from the counting unit CNT is a discharge command signal. When the discharge command signal is outputted at the point of time t23 (the voltage VE becomes the H level), the discharge switch SD is turned on (becomes conductive), and a charge stored in the X capacitor C100 is discharged. Along with such discharging of the charge, the voltage VA and the voltage VC gradually fall.

In this manner, in the embodiment 2, a change state of falling of the voltage of the X capacitor C100 is detected, and a discharge is controlled such that a change stored in the X capacitor C100 is discharged based on the change state.

Embodiment 3

The embodiment 1 is an embodiment where a change state of rising of a voltage of the X capacitor C100 is detected, and the embodiment 2 is an embodiment where a change state of falling of the voltage of the X capacitor C100 is detected. On the other hand, an embodiment 3 is an embodiment where change states of both rising and falling of a voltage of an X capacitor C100 are detected.

A circuit of the embodiment 3 is a circuit formed by combining the circuit of the embodiment 1 and the circuit of the embodiment 2, and the circuit of the embodiment 3 acquires the manner of operation and advantageous effects substantially equal to the combination of the manner of operation and advantageous effects of the embodiment 1 and the manner of operation and advantageous effects of the embodiment 2.

Hereinafter, the embodiment 3 is described in detail.

Figure 6:
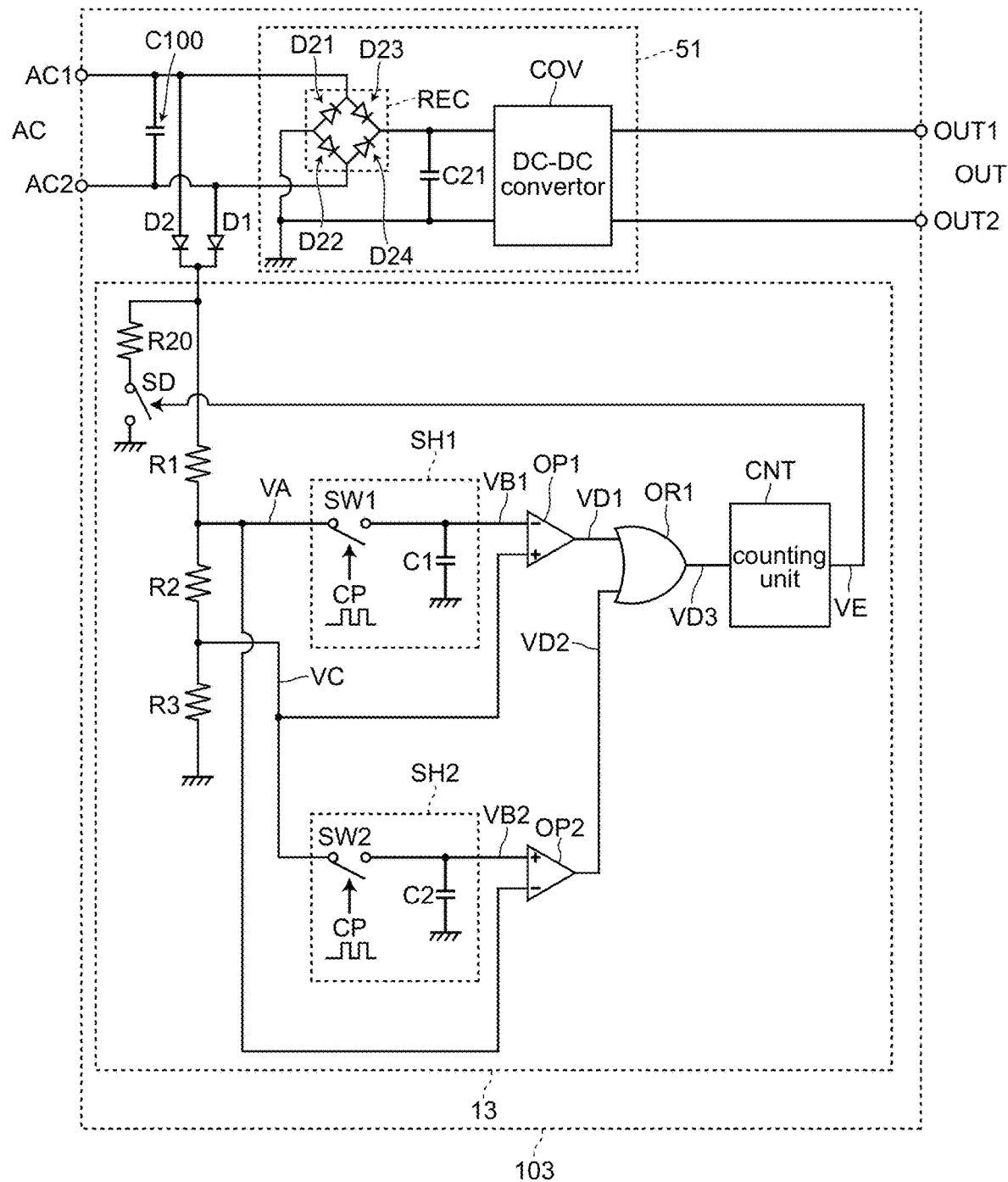
FIG. 6 is a view for describing the circuit configuration of a power source device 103 (and a control circuit 13 of the power source device 103) according to an embodiment 3.
Figure 7:
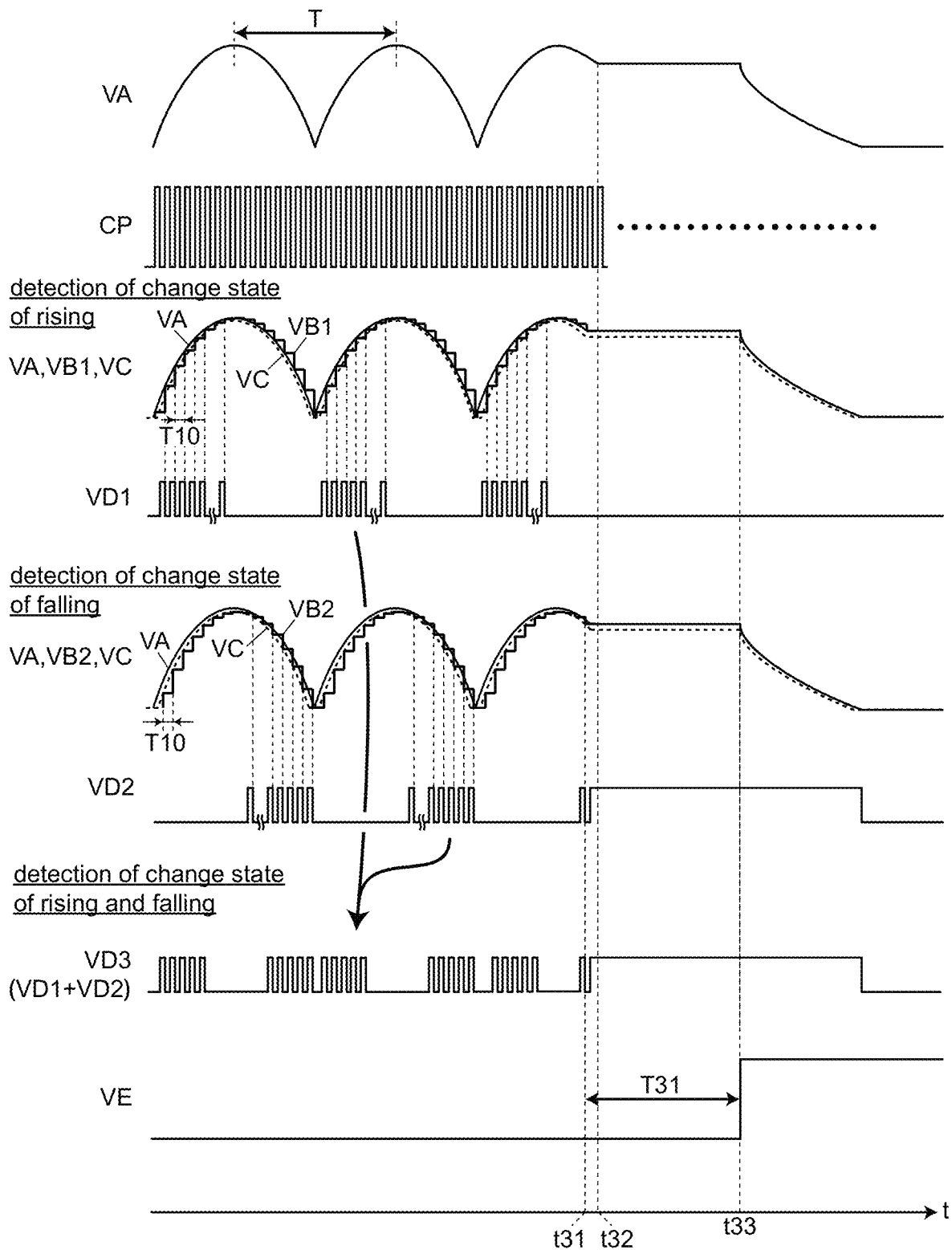
FIG. 7 is a view for describing operation timing of the power source device 103 (and the control circuit 13 of the power source device 103) according to the embodiment 3.

FIG. 6 is a view for describing the circuit configuration of a power source device 103 (and a control circuit 13 of the power source device 103) according to the embodiment 3. FIG. 7 is a view for describing operation timing of the power source device 103 (and the control circuit 13 of the power source device 103) according to the embodiment 3.

As shown in FIG. 6, the control circuit 13 and the like according to the embodiment 3 include: the sample hold circuit SH1 and the comparator OP1 according to the embodiment 1 (see FIG. 1); the sample hold circuit SH2 and the comparator OP2 according to the embodiment 2 (see FIG. 4); a logical sum element OR1 which takes a logical sum of a voltage VD1 outputted from the comparator OP1 and a voltage VD2 outputted from the comparator OP2.

A voltage VD3 outputted from the logical sum element OR1 is inputted to a counting unit CNT. The embodiment 3 is substantially equal to the embodiments 1 and 2 with respect to a point that the counting unit CNT outputs a discharge voltage VE.

With respect to the sample hold circuit SH1 and the comparator OP1, and the sample hold circuit SH2 and the comparator OP2, in the embodiment 3, these circuit configurations and inputting (connection) to the sample hold circuits SH1 and SH2 and the like are substantially equal to the corresponding circuit configurations and inputting (connection) in the embodiments 1 and 2 and hence, the description of these circuit configurations and inputting (connection) is omitted (see FIG. 1 and FIG. 4).

By adopting the circuit configuration shown in FIG. 6, when a voltage VA is rising, as indicated by "detection of change state of rising" in FIG. 7, voltages VA, VB1 and VC depict waveforms substantially equal to the corresponding waveforms in the embodiment 1, and a voltage VD1 substantially equal to the corresponding voltage in the embodiment 1 is outputted from the comparator OP1.

When the voltage VA is falling, as indicated by "detection of change state of falling" in FIG. 7, voltages VA, VB2 and VC depict waveforms substantially equal to the corresponding waveforms in the embodiment 2, and a voltage VD2 substantially equal to the corresponding voltage in the embodiment 2 is outputted from the comparator OP2.

The voltage VD3 outputted from the logical sum element OR1 is a voltage as the logical sum of the voltage VD1 and the voltage VD2 (VD1+VD2) (see FIG. 6). Accordingly, either one of the voltage VD1 outputted from the comparator OP1 and the voltage VD2 outputted from the comparator OP2 becomes an H level, the voltage VD3 becomes an H level. That is, as shown in "detection of change state of rising and falling" in FIG. 7, the voltage VD3 becomes a voltage as a logical sum of voltages outputted from both of the voltage VD1 shown in "detection of change state of rising" and the voltage VD2 shown in "detection of change state of falling". In this specification, "logical sum" is a logical operation where a voltage of an H level is outputted when either one of inputs is at an H level, and a voltage of L level is outputted when both inputs are at an L level.

The voltage VD3 outputted from the logical sum element OR1 is inputted to the counting unit CNT. The counting unit CNT resets counting when the counting unit CNT detects falling of the voltage VD3 from an H level to an L level, and starts counting (point of time t31). A predetermined time T31 is set in advance in the counting unit CNT. When no change occurs in the voltage VD3 after the counting unit CNT starts counting of time from the point of time t31, the voltage VE is shifted from the L level to the H level at a point of time t33 which comes after a lapse of the predetermined time T31 from the point of time t31 so that the discharge switch SD is turned on. Accordingly, a charge stored in the X capacitor C100 is discharged.

The voltage VE (the voltage at the H level) outputted from the counting unit CNT is a discharge command signal. When the discharge command signal is outputted (the voltage VE becomes the H level) at the point of time t23, the discharge switch SD is turned on (becomes conductive), and a charge stored in the X capacitor C100 is discharged. Along with such discharging of the charge, the voltage VA and the voltage VC gradually fall.

With such an operation, a change state of the voltage can be detected by the detection of a change state of at least one of rising and falling of the voltage of the X capacitor C100 and hence, the interruption of inputting of an alternating current AC can be detected with more certainty. Accordingly, a time difference in counting between when rising of the voltage is stopped and when falling of the voltage is stopped is reduced and hence, it is possible to output a discharge signal with more certainty.

Embodiment 4

An embodiment 4 is an embodiment where change states in both rising and falling of a voltage of an X capacitor C100 are detected in the same manner as the embodiment 3. However, the embodiment 4 is an embodiment where the change states of both rising and falling of the voltage are detected by using the same circuit as much as possible.

Figure 8:
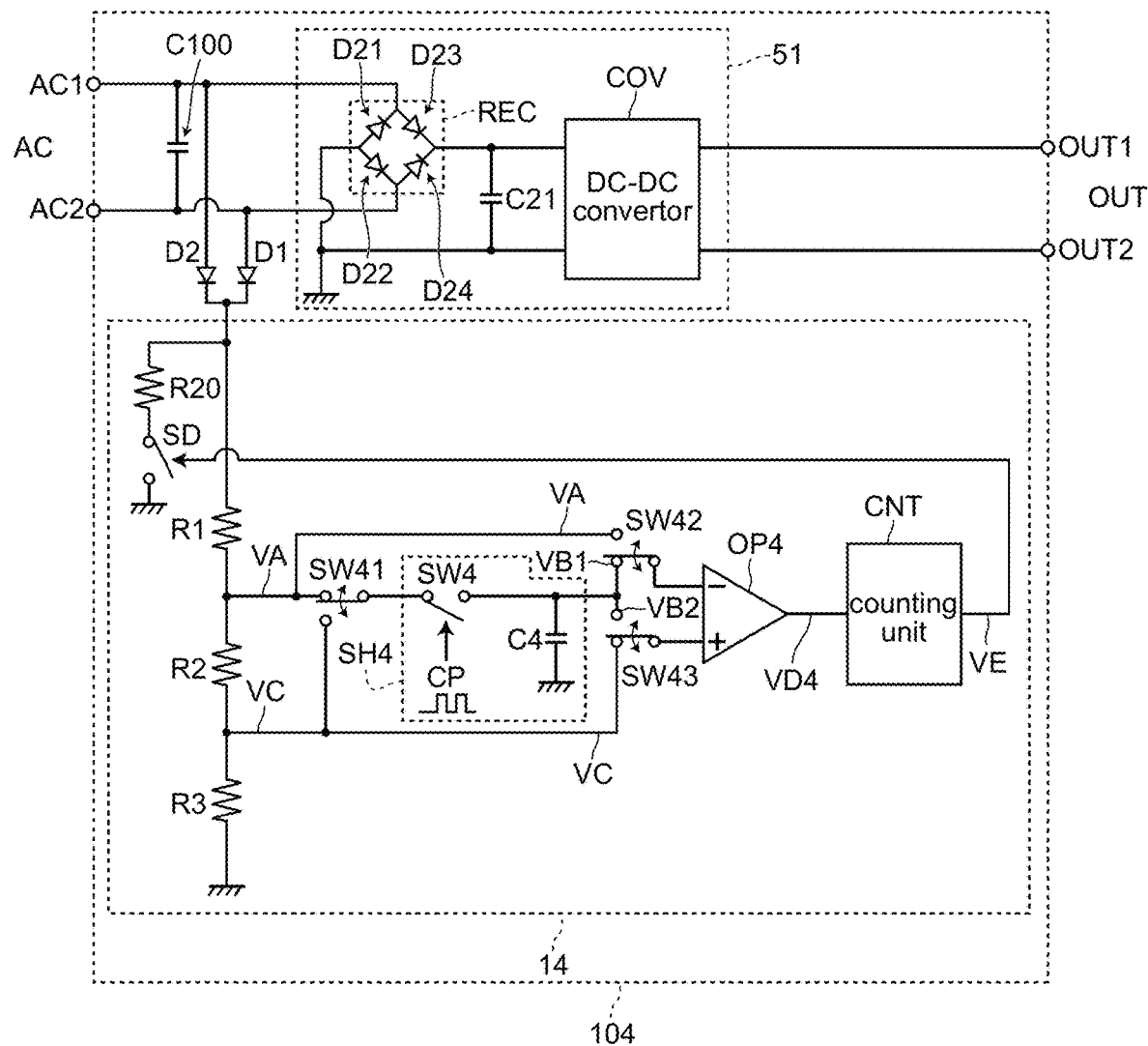
FIG. 8 is a view for describing the circuit configuration of a power source device 104 (and a control circuit 14 of the power source device 104) according to an embodiment 4.

Accordingly, in the embodiment 4, as shown in FIG. 8, with the use of switches SW41, SW42 and SW43, a sample hold circuit SH4 and a comparator OP4 can be used for detecting change states of both rising and falling of a voltage. Unlike the embodiment 3 (see FIG. 5) where the sample hold circuit SH1 and the comparator OP1 for detecting a change state of rising of a voltage of the X capacitor C100 and the sample hold circuit SH2 and the comparator OP2 for detecting a change state of falling of the voltage of the X capacitor C100 are provided, in the embodiment 4, it is unnecessary to provide dedicated circuits for rising and falling of the voltage of the X capacitor C100 and hence, a control circuit 14 can be simplified.

Hereinafter, the embodiment 4 is described in detail.

FIG. 8 is a view for describing the circuit configuration of a power source device 104 (and the control circuit 14 of the power source device 104) according to the embodiment 4.

In the embodiment 4, as shown in FIG. 8, the control circuit 14 includes: a voltage dividing circuit having resistances R1, R2 and the like for taking out a voltage VA and a voltage VC; the sample hold circuit SH4 for sample-holding the voltage VA and the like; the comparator OP4; the switches (SW41, SW42 and SW43) for switching inputting to the sample hold circuit SH4 and the comparator OP4; a counting unit CNT; and a discharge switch SD.

The sample hold circuit SH4 is a circuit substantially equal to the sample hold circuit SH1 (see FIG. 1, FIG. 6 and the like), and has a switch SW4 and a sample hold capacitor C4. One side of the switch SW4 forms an input part of the sample hold circuit SH4, the other side of the switch SW4 is connected to one side of the capacitor C4 and forms an output part. The other side of the capacitor C4 is grounded.

The switches SW41, SW42 and SW43 are switches which detect change states of both rising and falling by changing the circuit configuration by switching the switch connection between rising and falling of a voltage of the X capacitor C100. All switches are formed so as to switch a connection state by connecting either one of a contact on a left upper side or a left lower side of the switch using a right side of the switch as a fulcrum in FIG. 8.

Detection of Change State of Rising of Voltage of X Capacitor C100

The connection states of the switches SW41, SW42 and SW43 shown in FIG. 8 are connection states when a change state of rising of a voltage of the X capacitor C100 is detected.

In this case (when the change state of rising is detected), a voltage VA at a connecting portion between the resistances R1 and R2 is inputted to the sample hold circuit SH4 via the switch SW41, and a voltage VB1 outputted from the sample hold circuit SH4 is inputted to an inverted input terminal (−) of the comparator OP4 via the switch SW42. A voltage VC at a connecting portion between resistances R2 and R3 is inputted to a non-inverted input terminal (+) of the comparator OP4 via the switch SW43. In the comparator OP4, a comparison operation between the voltage VB1 and the voltage VC is performed, and a comparison operation result is outputted as a voltage VD4.

In this manner, when the change state of rising of the voltage of the X capacitor C100 is detected, the switches SW1, SW42 and SW43 take the above-mentioned states. This circuit has substantially the same circuit configuration as the circuit when the change state of rising of the voltage of the X capacitor C100 is detected in the embodiment 1 (or embodiment 3) shown in FIG. 1 (or FIG. 6) (the circuit formed of the sample hold circuit SH1, the comparator OP1 and the like), and acquires substantially the same manner of operation and advantageous effects.

Accordingly, the control circuit 14 can detect the change state of rising of the voltage of the X capacitor C100 in the same manner as the embodiment 1 shown in FIG. 1 (or the embodiment 3).

Detection of Change State of Falling of Voltage of X Capacitor C100

In detecting a change state of falling of a voltage of the X capacitor C100, the connection of the switches SW41, SW42 and SW43 is brought into a connection state opposite to the connection state shown in FIG. 8.

To be more specific, in the switch SW42, a contact on a left upper side is connected opposite to the connection shown in FIG. 8, and in the switch SW41, a contact on a left lower side is connected opposite to the connection shown in FIG. 8. With such connection, a voltage VA at the connecting portion between the resistance R1 and the resistance R2 is inputted to the inverted input terminal (−) of the comparator OP4.

In the switch SW41, a contact on a left lower side is connected opposite to the connection shown in FIG. 8 and hence, a voltage VC at the connecting portion between the resistances R2 and R3 is inputted to the sample hold circuit SH4 via the switch SW41. In the switch SW43, a contact on a left upper side is connected opposite to the connection shown in FIG. 8, a voltage VB2 outputted from the sample hold circuit SH4 is inputted to the non-inverted input terminal (+) of the comparator OP4.

Then, the comparator OP4 performs a comparison operation between the voltage VA inputted to the inverted input terminal (−) and the voltage VB2 inputted to the non-inverted input terminal (+), and outputs a comparison operation result as the voltage VD4. The counting unit CNT receives inputting of the voltage VD4 from the comparator OP4 and outputs a voltage VE.

In this manner, in detecting a change state of falling of a voltage of the X capacitor C100, the connection of the switches SW41, SW42 and SW43 takes a connection state opposite to the connection state shown in FIG. 8 described above. This circuit has substantially the same circuit configuration as the circuit when the change state of falling of the voltage of the X capacitor C100 is detected in the embodiment 2 (or embodiment 3) shown in FIG. 4 (or FIG. 6) (the circuit formed of the sample hold circuit SH2, the comparator OP2 and the like), and acquires substantially the same manner of operation and advantageous effects.

Accordingly, the control circuit 14 can detect the change state of falling of the voltage of the X capacitor C100 in the same manner as the embodiment 1 shown in FIG. 4 (or the embodiment 3).

The switching of the switches SW41, SW42 and SW43 may be performed such that rising and falling of the voltage of the X capacitor C100 (or the voltage VA or the like) is detected, and the switches SW41, SW42 and SW43 are switched in response to rising or falling of the voltage.

Alternatively, a cycle of the voltage of the X capacitor C100 (or the voltage VA or the like) is measured, and the switches are switched at a point of time that the voltage VA becomes a lowest voltage (at a point of time the voltage VA forms a valley between crest-shaped waveforms of the voltage VA in FIG. 2, FIG. 7 and the like) and, thereafter, the switches are switched again after a lapse of a half cycle ((½)·T).

In this manner, in the embodiment 4, as an output voltage VD4 of the comparator OP4, a voltage VD1 substantially equal to the voltage VD1 explained in the embodiment 1 or the embodiment 3 is outputted when the voltage of the X capacitor C100 (or the voltage VA or the like) is rising, and a voltage VD2 substantially equal to the voltage VD2 explained in the embodiment 2 or the embodiment 3 is outputted when the voltage of the X capacitor C100 (or the voltage VA or the like) is falling.

The waveforms of the voltage VA, the voltage VB1, the voltage VB2, the voltage VC, the voltage VD3, the voltage VE and the like are substantially equal to the waveforms of the corresponding voltages in the embodiment 1 (see FIG. 2, FIG. 3), embodiment 2 (see FIG. 5) or the embodiment 3 (see FIG. 7) and hence, the description of these waveforms is omitted.

By adopting the circuit configuration of the embodiment 4, with the use of the switches SW41, SW42 and SW43, the same sample hold circuit SH4 and the comparator OP4 can be used in detecting the change states of both rising and falling of the voltage of the X capacitor C100. Accordingly, the control circuit can be further simplified and downsized.

Embodiment 5

An embodiment 5 is an embodiment obtained by modifying the embodiment 1. The embodiment 5 differs from the embodiment 1 with respect to points such as the manner of generating a voltage VA and the like and the sophistication of a circuit and the like.

Hereinafter, the embodiment 5 is described in detail.

Figure 9:
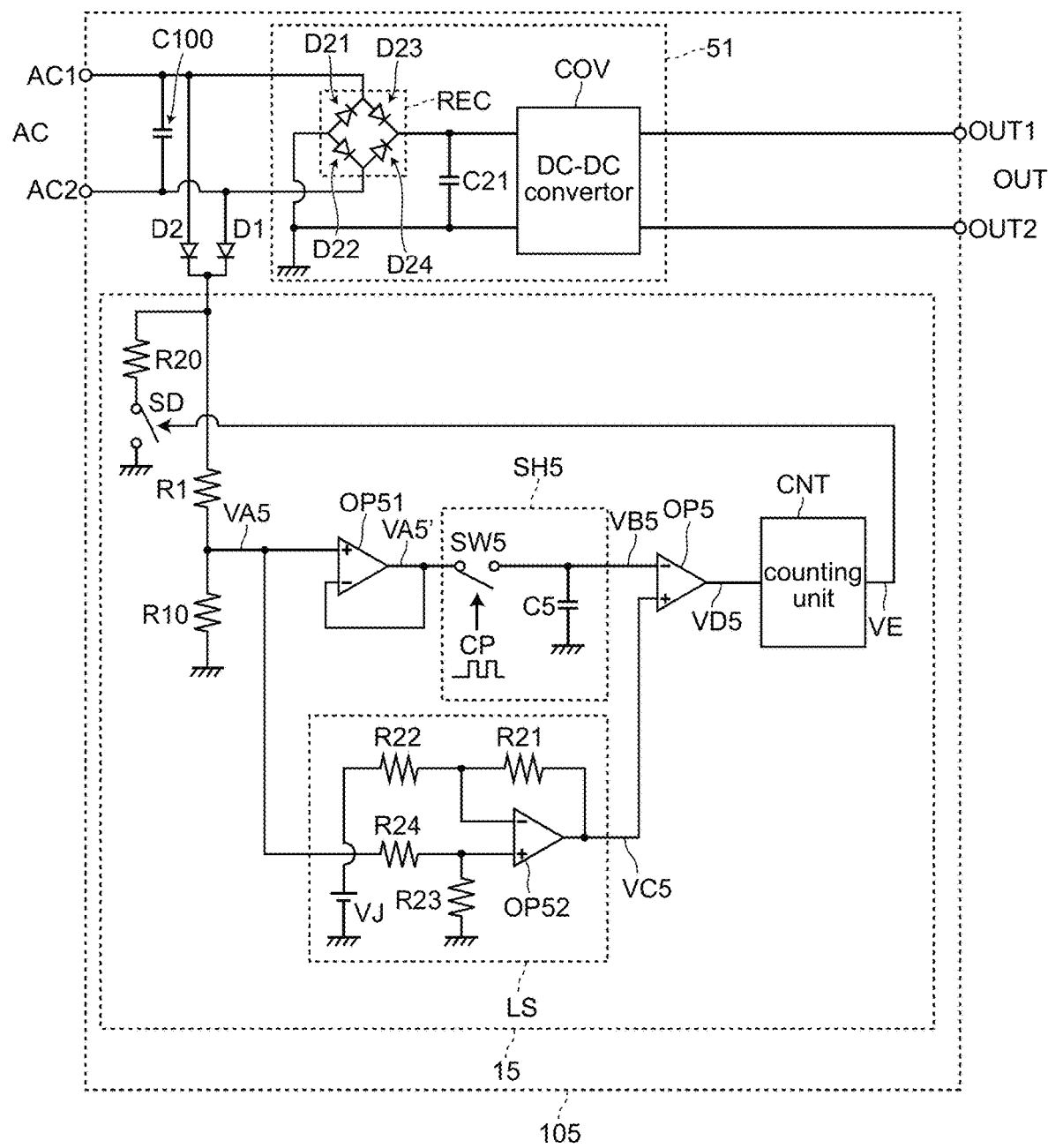
FIG. 9 is a view for describing the circuit configuration of a power source device 105 (and a control circuit 15 of the power source device 105) according to an embodiment 5.
Figure 10:
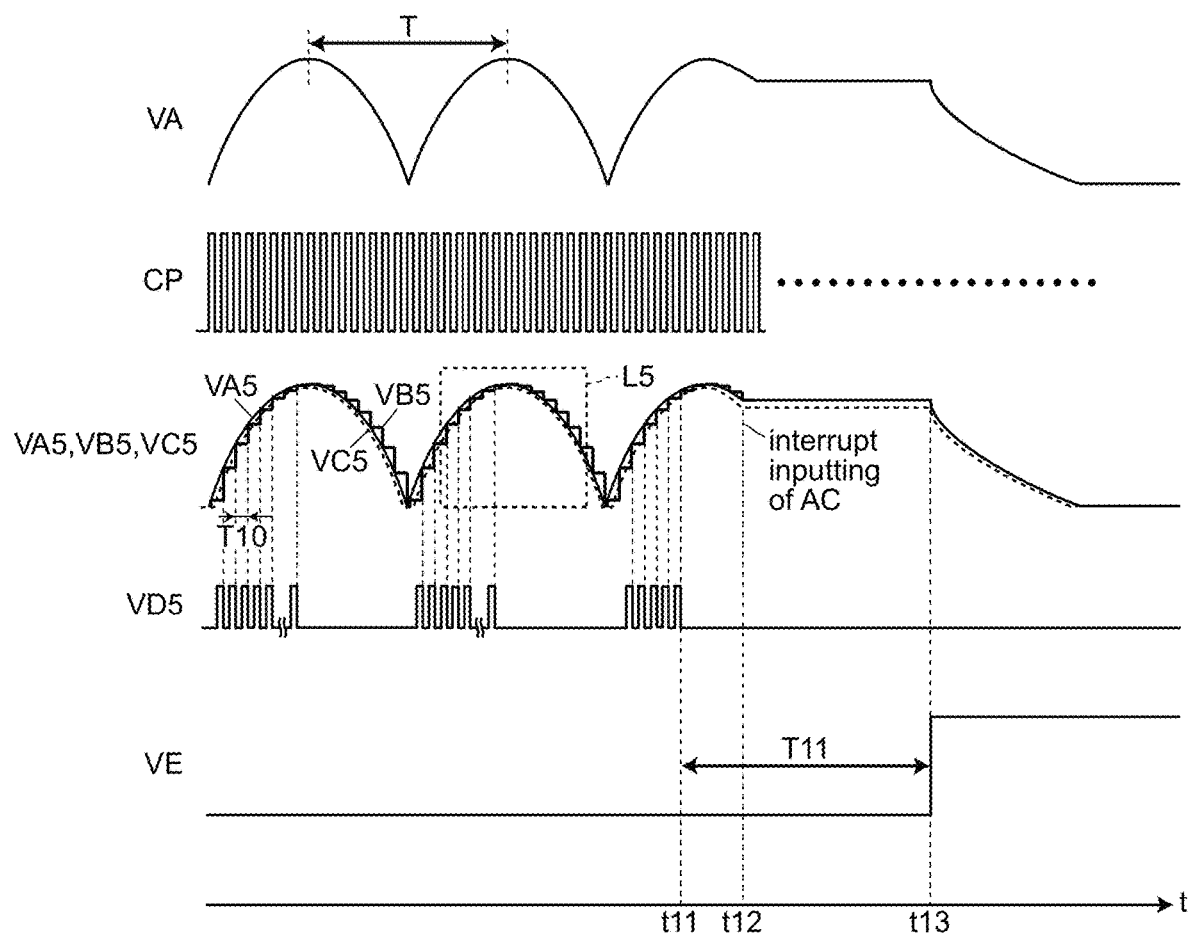
FIG. 10 is a view for describing operation timing of the power source device 105 (and the control circuit 15 of the power source device 105) according to the embodiment 5.
Figure 10:
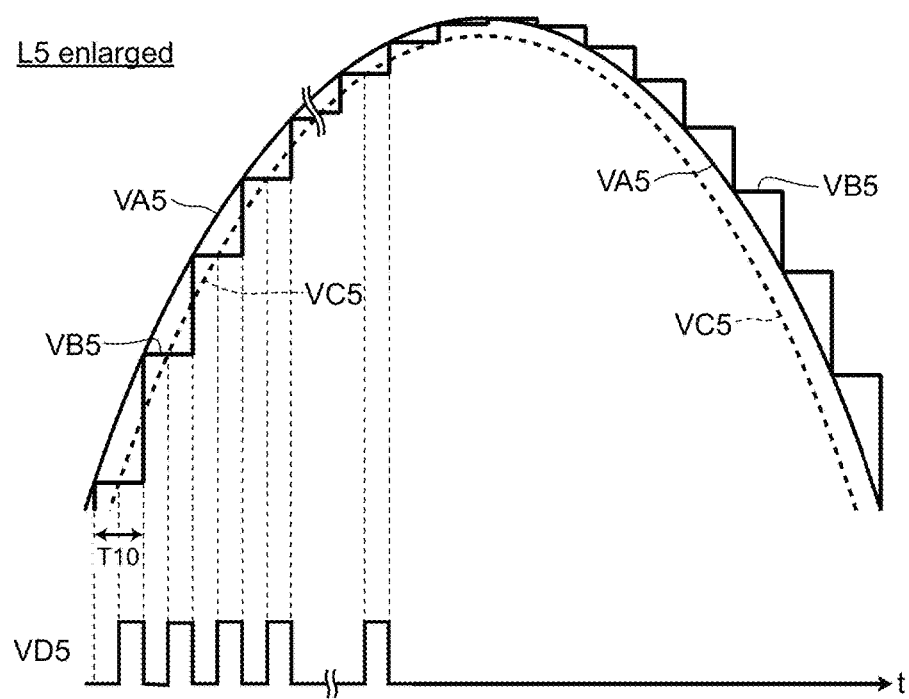

FIG. 9 is a view for describing the circuit configuration of a power source device 105 (and a control circuit 15 of the power source device 105) according to the embodiment 5. FIG. 10 is a view for describing operation timing of the power source device 105 (and the control circuit 15 of the power source device 105) according to the embodiment 5.

The control circuit 15 and the like according to the embodiment 5 are basically equal to the control circuit 11 and the like according to the embodiment 1. However, the control circuit 15 and the like according to the embodiment 5 shown in FIG. 9 differs from the control circuit 11 and the like according to the embodiment 1 with respect to points such as the manner of generating the voltage VA and the like and the sophistication of the circuit.

The control circuit 15 according to the embodiment 5 includes: a voltage dividing circuit having resistances R1 and R10; an operation amplifier OP51; a sample hold circuit SH5; a level shift circuit LS of a voltage; a comparator OP5; a counting unit CNT.

First, the voltage dividing circuit having the resistances R1 and R10 is described. In the embodiment 1 (see FIG. 1), voltage division is performed by connecting the resistances R1, R2 and R3 in series between the cathodes of the diodes 1 and 2 and a GND, and a voltage at the connecting portion between the resistances R1 and R2 is set as a voltage VA (first voltage), and a voltage at the connecting portion between the resistances R2 and R3 is set as a voltage VC (second voltage). However, the embodiment 5 differs from the embodiment 1 with respect to a point that, as shown in FIG. 9, voltage division is performed by connecting the resistances R1 and R10 in series between the cathodes of the diodes 1 and 2 and the GND, and a voltage VA5 is taken out from a connecting portion between the resistances R1 and R10.

In the embodiment 5, the voltage VA5 is used as a voltage which is a reference at the time of detecting a change state of a voltage of an X capacitor C100.

Between the cathodes of the diodes 1 and 2 and the GND, in parallel to a resistance R1-R10-GND path, in the same manner as FIG. 1 and the like, a resistance R20-switch SD-GND path is provided.

Next, the operation amplifier OP51 and the sample hold 089 circuit SH5 are described. The embodiment 5 differs from the embodiments 1 to 4 with respect to a point that the operation amplifier OP51 is provided between a voltage division part (the connecting part between the resistances R1 and R10) and the sample hold circuit (SH5).

To describe the operation amplifier OP51, the connecting portion between the resistances R1 and R10 is connected to a non-inverted input terminal (+) of the operation amplifier OP51. An inverted input terminal (−) of the operation amplifier OP51 is connected to an output terminal of the operation amplifier OP51. The operation amplifier OP51 forms a so-called voltage follower circuit from which a voltage VA5' which is equal to an input voltage VA5 is outputted, and functions as a buffer. The voltage VA5' outputted from the operation amplifier OP51 is inputted to the sample hold circuit SH5.

The sample hold circuit SH5 is a circuit substantially equal to the sample hold circuit SH1 (see FIG. 1) or the like, and has a switch SW5 and a capacitor C5. One side of the switch SW5 forms an input part of the sample hold circuit SH5, and the other side of the switch SW5 is connected to one side of the capacitor C5 and forms an output part of the sample hold circuit SH5. The other side of the capacitor C5 is grounded. The sample hold circuit SH5 samples an output voltage VA5' of the operation amplifier OP51 by turning on the switch SW5, turns off the switch SW5, holds the sampled voltage in the capacitor C5, and outputs the voltage as a sample hold voltage VB5.

Next, the embodiment 5 differs from the embodiments 1 to 4 with respect to a point that the level shift circuit LS is provided to the control circuit 15.

To describe the level shift circuit LS, the level shift circuit LS is provided between the connecting portion, which is between the resistances R1 and R10, and a non-inverted input terminal (+) of the comparator OP5. The level shift circuit LS receives inputting of a voltage VA 5 at the connecting portion between the resistances R1 and R10, and outputs the voltage VA5 as a voltage VC5, a voltage level of which is shifted. In other words, the inputted voltage VA5 is outputted as the voltage VC5 which is made to fall (level shifted) by an amount of (VA5−VJ) (VJ being a reference voltage or a fixed voltage).

The level shift circuit LS includes an operation amplifier OP52 and resistances R21, R22, R23 and R24 (R21 to R24 having the same resistance value).

One sides of the resistance R21 and the resistance R22 are connected to an inverted input terminal (−) of the operation amplifier OP52, and the other side of the resistance R21 is connected to an output terminal of the operation amplifier OP52. The other side of the resistance R22 is biased by the reference voltage (fixed voltage) VJ. The output terminal of the operation amplifier OP52 forms an output part of the level shift circuit LS.

One sides of the resistances R23 and R24 are connected to a non-inverted input terminal (+) of the operation amplifier OP52. The other side of the resistance R23 is grounded (connected to the GND). The other side of the resistance R24 forms an input part of the level shift circuit LS, and is connected to the connecting portion between the resistances R1 and R10 (inputting the voltage VA5).

To describe the comparator OP5, an inverted input terminal (−) of the comparator OP5 is connected to an output part of the sample hold circuit SH5 (a side of the capacitor C5 opposite to the GND), and a voltage VB5 outputted from the sample hold circuit SH5 is inputted to the comparator OP5.

The non-inverted input terminal (+) of the comparator OP5 is connected to the output part of the level shift circuit LS (the output terminal of the operation amplifier OP52), and a voltage VC5 outputted from the level shift circuit LS is inputted to the comparator OP5.

The comparator OP5 performs a comparison operation between the sample hold voltage VB5 at the inverted input terminal (−) and the voltage VC5 at the non-inverted input terminal (+), and detects a change of the voltage VA5. When the voltage VC5 at the non-inverted input terminal (+) is larger than the voltage VB5 at the inverted input terminal (−), the voltage VD5 outputted from the comparator OP5 becomes a high level (H level), and becomes a low level (L level) in an opposite case.

The voltage VD5 outputted from the comparator OP5 is inputted to the counting unit CNT. When the voltage VD5 does not change for a fixed time in the same manner as the embodiments 1 to 4, the counting unit CNT changes a voltage VE from an L level to an H level so as to turn on the switch SD and hence, a charge stored in the X capacitor C100 is discharged.

FIG. 10 is a view for describing operation timing of the power source device 105 (and the control circuit 15 of the power source device 105) according to the embodiment 5.

In FIG. 10, in order from the top, a timing chart of a voltage VA5, a timing chart of a clock pulse CP, a timing chart where the voltage VA5, the voltage VB5 and the voltage VC5 are depicted in a superposed manner, a timing chart of a voltage VD5, a timing chart of a voltage VE and the like are shown.

At a lower portion of FIG. 10, a portion indicated by "L5" in the timing chart depicted by superposing the voltage VA5 and the like on a third stage from the top in FIG. 10 is shown as "L5 enlarged" (drawing).

The timing charts shown in FIG. 10 overlap with the timing charts shown in FIG. 1 and the like in many points and hence, the description of the timing charts shown in FIG. 10 is omitted.

Embodiment 6

An embodiment 6 is an embodiment obtained by modifying the embodiment 5.

In the embodiment 5, the voltage VB5 outputted from the sample hold circuit SH5 is inputted to the inverted input terminal (−) of the comparator OP5, the voltage VC5 outputted from the level shift circuit LS is inputted to the non-inverted input terminal (+) of the comparator OP5, the comparator OP5 performs a comparison operation of the magnitude relationship between the voltage VB5 and the voltage VC5, the comparator OP5 outputs a comparison operation result as a voltage VD5, and the voltage VD5 is inputted to the counting unit CNT (see FIG. 9). On the other hand, the embodiment 6 differs from the embodiment 5 with respect to the point that a subtraction circuit 201 is provided at the stage after a sample hold circuit SH5, a voltage VG (=VA5−VB5) outputted from the subtraction circuit 201 is inputted to a non-inverted input terminal (+) of a comparator OP62, a fixed voltage (reference voltage) VK is inputted (applied, biased) to an inverted input terminal (−) of the comparator OP62, the comparator OP62 performs a comparison operation of the magnitude relationship between the voltage VG and the fixed voltage VK, and outputs a comparison operation result as a voltage VD6, and the voltage VD6 is inputted to the counting unit CNT (see FIG. 11).

Figure 11:
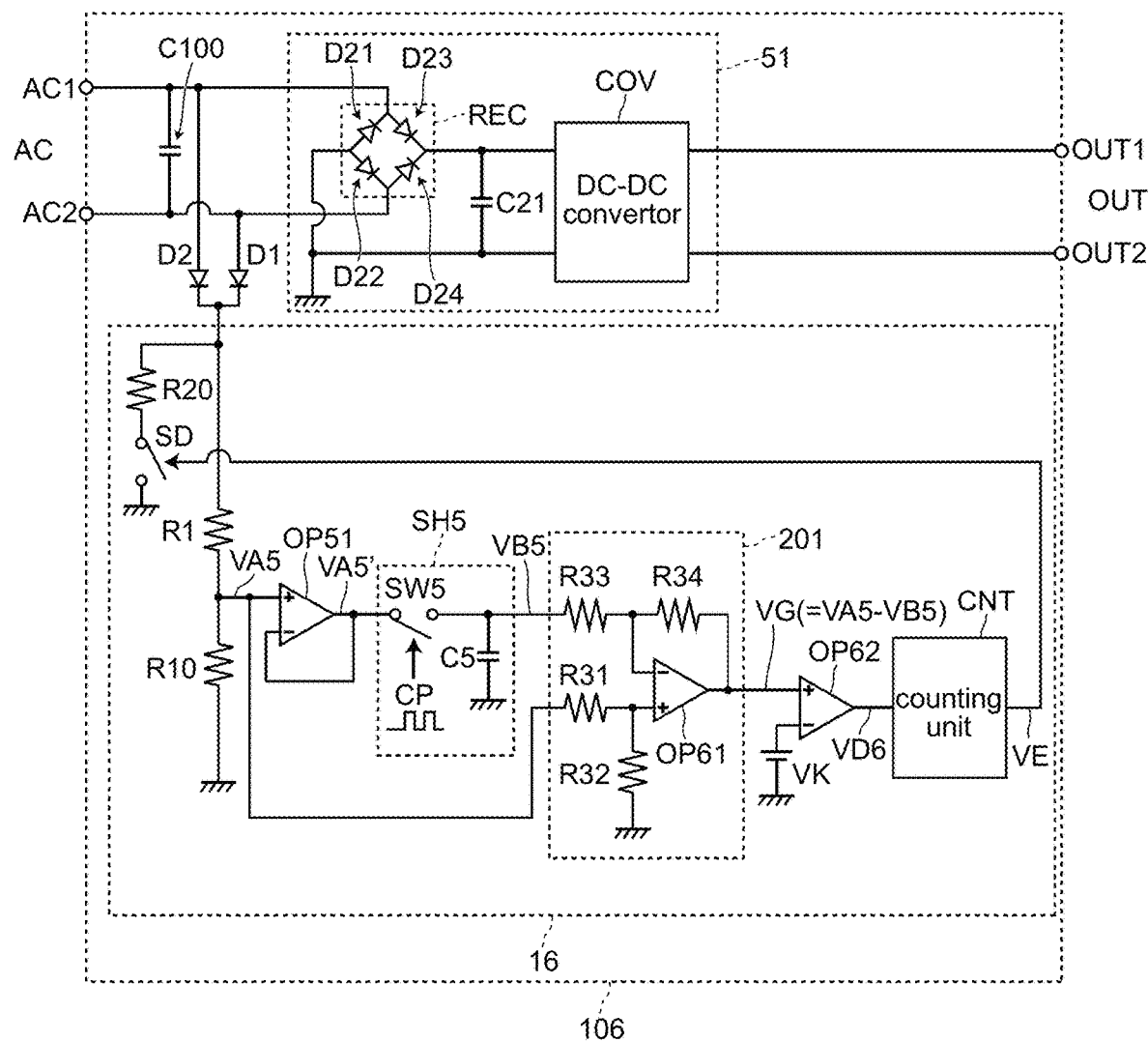
FIG. 11 is a view for describing the circuit configuration of a power source device 106 (and a control circuit 16 of the power source device 106) according to an embodiment 6.

FIG. 11 is a view for describing the circuit configuration of a power source device 106 (and a control circuit 16 of the power source device 106) according to the embodiment 6. Symbols in FIG. 11 same to the symbols in FIG. 9 and the like indicate the same constitutional elements, and such constitutional elements shown in FIG. 11 acquire substantially the same manner of operation and advantageous effects and hence, the repeated description of such constitutional elements is omitted as much as possible.

The control circuit 16 according to the embodiment 6 includes: a voltage follower circuit formed of an operation amplifier OP51 and the like; a sample hold circuit SH5 disposed on a succeeding stage; the subtraction circuit 201 disposed on a succeeding stage; the comparator OP62 disposed on a succeeding stage; and the counting unit CNT disposed on a succeeding stage and the like. A voltage VB5 outputted from the sample hold circuit SH5 and a voltage VA5 at a connecting portion between resistances R1 and R10 are inputted to the subtraction circuit 201, and the voltage difference between both voltages is outputted from the subtraction circuit 201 as a voltage VG (=VA5−VB5).

To describe the subtraction circuit 201, the subtraction circuit 201 is formed of an operation amplifier OP61, and resistances R31, R32, R33 and R34 (R31 to R34 having the same resistance value).

One sides of the resistances R33 and R34 are connected to an inverted input terminal (−) of the operation amplifier OP61 which forms the subtraction circuit 201, and the other side of the resistance R34 is connected to an output terminal of the operation amplifier OP61. The output terminal of the operation amplifier OP61 forms an output part of the subtraction circuit 201. The other side of the resistance R33 forms one of two input parts of the subtraction circuit 201, is connected to an output part of a sample hold circuit SH5 (one side of a capacitor C5), and a voltage VB5 is inputted to the subtraction circuit 201.

One sides of the resistances R31 and R32 are connected to a non-inverted input terminal (+) of the operation amplifier OP61. The other side of the resistance R32 is grounded (GND).

The other side of the resistance R31 forms the other one of two input parts of the subtraction circuit 201, is connected to the connecting portion between the resistances R1 and R10, and a voltage VA5 is inputted to the subtraction circuit 201.

The voltage VB5 and the voltage VA5 are inputted to the subtraction circuit 201 having such a configuration, and a voltage VG which is a difference between the voltage VB5 and the voltage VA5 (=VA5−VB5) is outputted from the subtraction circuit 201 (the voltage VG being outputted to the comparator OP62).

Next, the comparator OP62 is described. The voltage VG (=VA5−VB5) outputted from the subtraction circuit 201 is inputted to the non-inverted input terminal (+) of the comparator OP62, and a fixed voltage (reference voltage) VK is inputted to an inverted input terminal (−). The comparator OP62 performs a comparison operation between the voltage VG (=VA5−VB5) and the fixed voltage (reference voltage) VK, and outputs a comparison operation result as a voltage VD6.

The voltage VD6 outputted from the comparator OP62 is inputted to the counting unit CNT. When a voltage VE at an H level is outputted from the counting unit CNT, a switch SD is turned on, and a charge stored in an X capacitor C100 is discharged.

Figure 12:
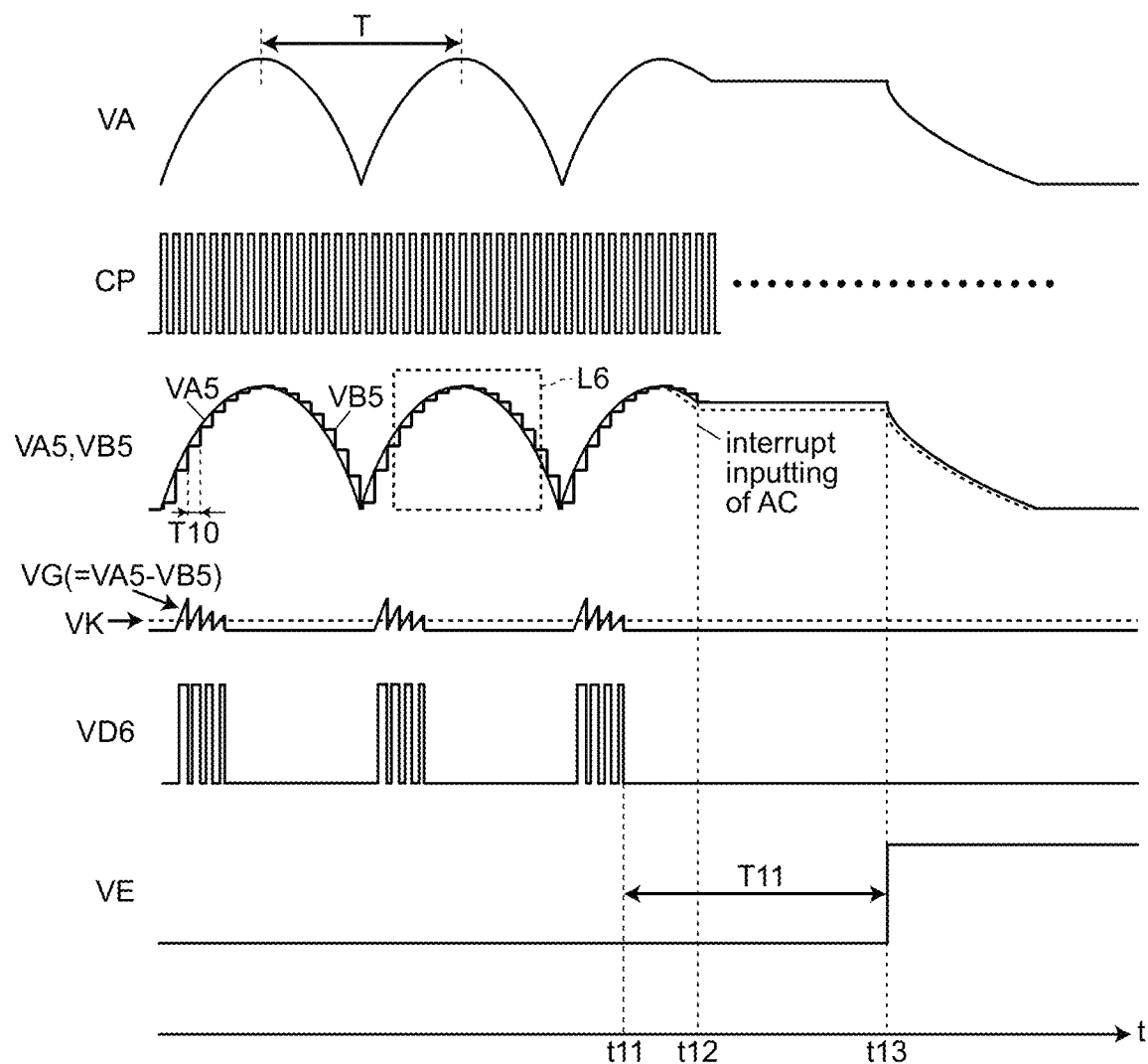
FIG. 12 is a view for describing operation timing of the power source device 106 (and the control circuit 16 of the power source device 106) according to the embodiment 6.
Figure 13:
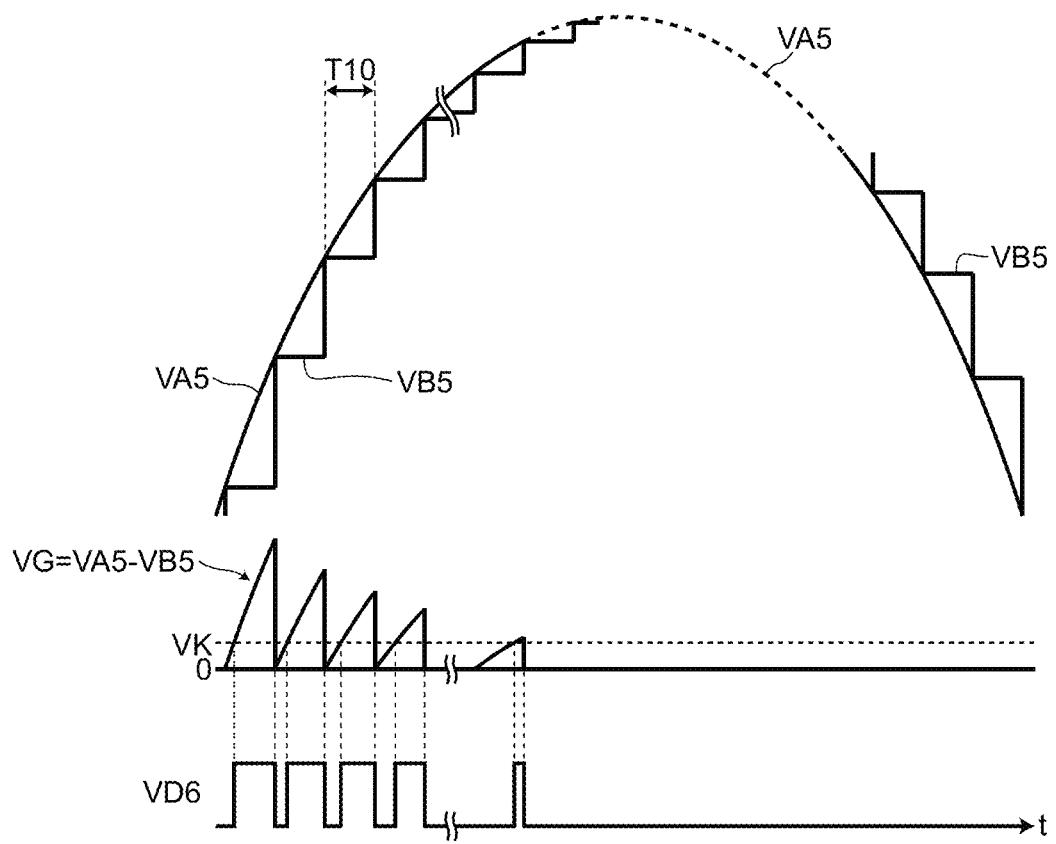
FIG. 13 is a view for describing a portion shown in FIG. 12 in an enlarged manner.

FIG. 12 is a view for describing operation timing of the power source device 106 (and the control circuit 16 of the power source device 106) according to the embodiment 6. FIG. 13 is a view for describing a portion (a portion indicated by a symbol L6) shown in FIG. 12 in an enlarged manner.

Timing charts shown in FIG. 12 and FIG. 13 overlap with the timing charts shown in FIG. 1 and the like in many points and hence, the description of such overlapping points is omitted as much as possible.

In FIG. 12, in order from the top, a timing chart of a voltage VA5, a timing chart of clock pulses CP, a timing chart where the voltage VA5 and a voltage VB5 are depicted in a superposed manner, a timing chart of a voltage VG (=VA5−VB5), a timing chart of a voltage VD6, a timing chart of a voltage VE and the like are described.

To explain the timing chart of the voltage VG (=VA5−VB5), the voltage VG is a voltage obtained by subtracting the voltage VB5, which is obtained by sample-holding a voltage VA5', from the voltage VA5, which is a voltage at the connecting portion between the resistances R1 and R10 by the subtraction circuit 201 and hence, a voltage waveform of the voltage VG becomes a sawtooth-shaped waveform as shown in FIG. 12 and FIG. 13.

Although the voltage VG outputted from the subtraction circuit 201 is inputted to the non-inverted input terminal (+) of the comparator OP62, a fixed voltage (reference voltage) VK is inputted to the inverted input terminal (−). Accordingly, the comparator OP62 performs a comparison operation between the voltage VG and the voltage VK, and outputs a comparison operation result as a voltage VD6 (see FIG. 12 and FIG. 13).

The voltage VK is a voltage which becomes a reference for comparing a magnitude relationship between the voltage VK and the voltage VG (a difference between the voltage VA5 and the voltage VB5), and can be easily changed. For example, the following advantageous effects can be obtained. By making the voltage VK small, comparison and detection can be performed even when the voltage VG (the difference between the voltage VA5 and the voltage VB5) is small. As an opposite case, by making the voltage VK large, comparison and detection can be performed in a case where the voltage VG (the difference between the voltage VA5 and the voltage VB5) is a fixed magnitude or more and hence, the control circuit is minimally affected by noises.

The voltage VD6 outputted from the comparator OP62 is inputted to the counting unit CNT. When the voltage VD6 does not change for a fixed time in the same manner as the embodiments 1 to 5, the counting unit CNT changes the voltage VE from an L level to an H level so as to turn on the switch SD and hence, a charge stored in the X capacitor C100 is discharged.

Although the present invention has been descried based on the above-mentioned embodiments heretofore, the present invention is not limited to the above-mentioned embodiments. The present invention can be carried out in various modes without departing from the gist of the present invention. For example, the following modifications are also conceivable.

(1) In the above-mentioned embodiments 1 to 6, a MOSFET element is used as the switches (SD, SW1, SW2 and the like). However the other semiconductor such as an IGBT element can be used in place of the MOSFET element.

(2) In the above-mentioned embodiments 1 to 6, the control circuit and the like shown in FIG. 1 and the like are used. Such control circuit 11 and the like may be replaced by a microprocessor. In this case, control conditions can be changed by changing a software without changing a hardware and hence, a flexible discharge control can be performed.

REFERENCE SIGNS LIST 11, 12, 13, 14, 15, 16: control circuit
101, 102, 103, 104, 105, 106: power source device
AC: alternating current
DC: direct current
AC1, AC2: input terminals
OUT: output
OUT1, OUT2: output terminals
C21: capacitor (for smoothing)
C1, C2, C4, C5: capacitor (for sample-holding)
C100: capacitor (X capacitor)
COV: DC-DC convertor
51: AC-DC convertor
REC: rectifier circuit
D1, D2, D21, D22, D23, D24: diode
R1, R2, R3, R10: resistance (for dividing voltage)
R20: resistance (for discharging)
R21, R22, R23, R24, R31, R32, R33, R34: resistance
SW1, SW2, SW4, SW5: switch (for sample-holding)
SW41, SW42, SW43: switch (for switching circuit)
SD: switch (for discharging)
SH1, SH2, SH4, SH5: sample hold circuit
OP1, OP2, OP4, OP5, OP62: comparator
OP51, OP52, OP61: operation amplifier
CNT: counting unit
OR1: logical sum element
LS: level shift circuit
201: subtraction circuit
CP: clock pulse
VA: voltage at connecting portion between resistances R1 and R2
VC: voltage at connecting portion between resistances R2 and R3
V10: differential voltage between connecting portion between resistances R1 and R10 and connecting portion between resistances R2 and R3
VA5: voltage at connecting portion between resistances R1 and R10
VA5': voltage outputted from operation amplifier OP51
VB1: sample hold voltage at connecting portion between resistances R1 and R2 (voltage VA)
VB2: sample hold voltage at connecting portion between resistances R2 and R3 (voltage VC)
VB5: sample hold voltage of output voltage (voltage VA5') of operation amplifier OP51
VC5: voltage outputted from level shift circuit LS
VD1: voltage outputted from comparator OP1
VD2: voltage outputted from comparator OP2
VD3: voltage outputted from logical sum element OR1
VD4: voltage outputted from comparator OP4
VD5: voltage outputted from comparator OP5
VD6: voltage outputted from comparator OP62
VE: voltage outputted from counting unit CNT (for discharge command)
t11, t12, t13, t21, t22, t23: point of time
T: cycle
T11, T21: predetermined time until start of discharging
T10: sample hold cycle
VJ, VK: reference voltage (fixed voltage)

What is claimed is:

1. A control circuit for controlling a discharge of a capacitor connected between power source lines having different polarities of an alternating current of an AC-DC convertor which is configured to receive inputting of the alternating current, convert the alternating current into a direct current, and output the direct current, wherein
the control circuit is configured to detect a change state of at least one of rising or falling of a voltage of the capacitor and control the discharge such that a charge stored in the capacitor is discharged based on the change state, and
the control circuit is configured to perform detection of the change state of the voltage of the capacitor (1) by setting a first voltage obtained by level-shifting the voltage of the capacitor and a second voltage which is increased or decreased from the first voltage, and (2) by performing a comparison operation between a voltage obtained by sample-holding the first or the second voltage every fixed time and the first or the second voltage to which sample-holding is not applied.

2. The control circuit according to claim 1, wherein the comparison operation performed by the control circuit is
a comparison operation which compares and detects a magnitude relationship of the voltage obtained by sample-holding and the voltage to which sample-holding is not applied or
a comparison operation which outputs a voltage difference.

3. The control circuit according to claim 1, wherein
the control circuit is configured to perform detection of the change state of the voltage of the capacitor by detecting, assuming voltage values of the first voltage, the second voltage, and a voltage obtained by sample-holding one of the first or the second voltage as (1) a first voltage characteristic line, (2) a second voltage characteristic line and (3) a sample hold voltage characteristic line which are expressed with a lapse of time respectively, an intersection between the sample hold voltage characteristic line and the voltage characteristic line of the voltage to which sample-holding is not applied out of the first and the second voltages.

4. The control circuit according to claim 1, wherein the control circuit, when a state that there is no change in the change state continues for a fixed period is detected, is configured to control the discharge such that a charge stored in the capacitor is discharged.

5. The control circuit according to claim 4, wherein the control circuit is configured to perform detection that a state that there is no change in the change state continues for a fixed period by counting a time of the state that there is no change in the change state.

6. The control circuit according to claim 1, wherein
the control circuit is configured to detect a change state of at least one of rising or falling of the voltage of the capacitor, and control the discharge such that a charge stored in the capacitor is discharged based on the change state.

7. The control circuit according to claim 6, wherein
the control circuit is configured to detect the change state of rising of the voltage of the capacitor, and control the discharge such that a charge stored in the capacitor is discharged based on the change state.

8. The control circuit according to claim 1, wherein
the control circuit comprises:
- a first voltage generating unit which is configured to generate the first voltage obtained by level-shifting the voltage of the capacitor connected between the power source lines having different polarities;
- a second voltage generating unit which is configured to generate a second voltage smaller than the first voltage;
- a sample hold unit for sample-holding the first or the second voltage, the sample hold unit having: a sample hold capacitor for the first or the second voltage; and a sample hold switch disposed between the first or the second voltage generating unit and the sample hold capacitor;
- a comparison operation unit which is configured to detect the change state by performing a comparison operation between a sample hold voltage obtained by sample-holding by the sample hold unit out of the first and the second voltages and the voltage to which sample-holding is not applied out of the first and the second voltages; and
- a discharge unit which is configured to discharge a charge stored in the capacitor connected between the power source lines having different polarities based on the detected change state.

9. A power source device comprising:
- an AC-DC convertor which is configured to receive inputting of an alternating current and output a direct current;
- a capacitor connected between power source lines having different polarities of the alternating current; and
- the control circuit according to claim 1 which is configured to control a discharge of the capacitor.

10. A control circuit for controlling a discharge of a capacitor connected between power source lines having different polarities of an alternating current of an AC-DC convertor which is configured to receive inputting of the alternating current, convert the alternating current into a direct current, and output the direct current, wherein
the control circuit is configured to detect a change state of at least one of rising or falling of a voltage of the capacitor and control the discharge such that a charge stored in the capacitor is discharged based on the change state, and
the control circuit is configured to perform the detection of the change state of the voltage of the capacitor by comparing an output obtained by performing a comparison operation between a voltage obtained by sample-holding a first voltage obtained by level-shifting the voltage of the capacitor and the first voltage to which sample-holding is not applied with a reference voltage.

11. The control circuit according to claim 10, wherein
the control circuit comprises:
- a first voltage generating unit which is configured to generate the first voltage obtained by level-shifting the voltage of the capacitor connected between the power source lines having different polarities;
- a sample hold unit for the first voltage, the sample hold unit having: a sample hold capacitor for the first voltage; and a sample hold switch disposed between the first voltage generating unit and the sample hold capacitor;
- a comparison operation unit which is configured to detect the change state by comparing an output calculated based on a sample hold voltage for the first voltage obtained by sample-holding the first voltage by the sample hold unit and the first voltage to which sample-holding is not applied by the sample hold unit with a reference voltage; and
- a discharge unit which is configured to discharge a charge stored in the capacitor connected between the power source lines having different polarities based on the detected change state.

12. A power source device comprising:
- an AC-DC convertor which is configured to receive inputting of an alternating current and output a direct current;
- a capacitor connected between power source lines having different polarities of the alternating current; and
- the control circuit according to claim 10 which is configured to control a discharge of the capacitor.

* * * * *